United States Patent
Kamio

(10) Patent No.: US 11,939,074 B2
(45) Date of Patent: Mar. 26, 2024

(54) FLYING BODY WITH A CONTROL SECTION HAVING A PLURALITY OF OPERATIONAL MODES

(71) Applicant: HONDA MOTOR CO., LTD., Tokyo (JP)

(72) Inventor: Junichi Kamio, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 359 days.

(21) Appl. No.: 17/312,956

(22) PCT Filed: Oct. 16, 2019

(86) PCT No.: PCT/JP2019/040679
§ 371 (c)(1),
(2) Date: Jun. 11, 2021

(87) PCT Pub. No.: WO2020/137104
PCT Pub. Date: Jul. 2, 2020

(65) Prior Publication Data
US 2022/0055761 A1  Feb. 24, 2022

(30) Foreign Application Priority Data
Dec. 27, 2018  (JP) ................................. 2018-244605

(51) Int. Cl.
*B64D 31/06*  (2006.01)
*B60L 15/20*  (2006.01)
(Continued)

(52) U.S. Cl.
CPC .............. *B64D 31/06* (2013.01); *B60L 15/20* (2013.01); *B60L 50/60* (2019.02); *B60L 58/12* (2019.02);
(Continued)

(58) Field of Classification Search
CPC .. B64D 2027/026; B64D 31/06; B64D 35/08; B64C 27/006
See application file for complete search history.

(56) References Cited

U.S. PATENT DOCUMENTS 11,148,820 B1* 10/2021 Resnick ................. B64D 33/08
2010/0274420 A1* 10/2010 Veit .......................... B63H 3/10
440/75
(Continued)

FOREIGN PATENT DOCUMENTS

CN  108545199  9/2018
JP  2016-088110  5/2016
(Continued)

OTHER PUBLICATIONS

International Search Report and Written Opinion for International Application No. PCT/JP2019/040679 dated Dec. 3, 2019, 13 pages.

*Primary Examiner* — Joshua J Michener
*Assistant Examiner* — Arfan Y. Sinaki
(74) *Attorney, Agent, or Firm* — Amin, Turocy & Watson, LLP

(57) ABSTRACT

In a flying object, a PCU has a plurality of operation modes in which an engine and/or a motor generator is used as a driving source for a pusher propeller. In accordance with the state of the flying object, the PCU controls the engine, a first clutch, the motor generator, and a second clutch in one of the operation modes.

9 Claims, 15 Drawing Sheets

(51) Int. Cl.
*B60L 50/60* (2019.01)
*B60L 58/12* (2019.01)
*B64C 27/22* (2006.01)
*B64D 27/02* (2006.01)
*B64D 27/24* (2006.01)

(52) U.S. Cl.
CPC .............. *B64C 27/22* (2013.01); *B64D 27/24* (2013.01); *B60L 2200/10* (2013.01); *B64D 2027/026* (2013.01)

(56) References Cited

U.S. PATENT DOCUMENTS

| | | | |
|---|---|---|---|
| 2015/0285165 A1* | 10/2015 | Steinwandel | B64C 39/024 244/55 |
| 2016/0244157 A1 | 8/2016 | Welsh | |
| 2017/0029131 A1 | 2/2017 | Steinwandel et al. | |
| 2017/0225573 A1 | 8/2017 | Waltner | |
| 2017/0305548 A1 | 10/2017 | Ozaki | |
| 2017/0321601 A1 | 11/2017 | Lafargue et al. | |
| 2017/0327238 A1* | 11/2017 | Roever | B64D 29/00 |
| 2018/0065740 A1* | 3/2018 | Vondrell | B64C 29/0033 |
| 2018/0163558 A1 | 6/2018 | Vondrell et al. | |
| 2019/0084684 A1* | 3/2019 | Eller | B64D 27/24 |
| 2019/0127056 A1* | 5/2019 | Weekes | B64D 9/00 |
| 2019/0256202 A1* | 8/2019 | Resnick | B64C 39/024 |
| 2021/0276723 A1* | 9/2021 | Han | B64D 27/24 |
| 2022/0033097 A1* | 2/2022 | Botti | B64D 27/10 |

FOREIGN PATENT DOCUMENTS

| | | |
|---|---|---|
| JP | 2018-502242 | 1/2018 |
| JP | 2018-508407 | 3/2018 |
| JP | 2018-140767 | 9/2018 |

* cited by examiner

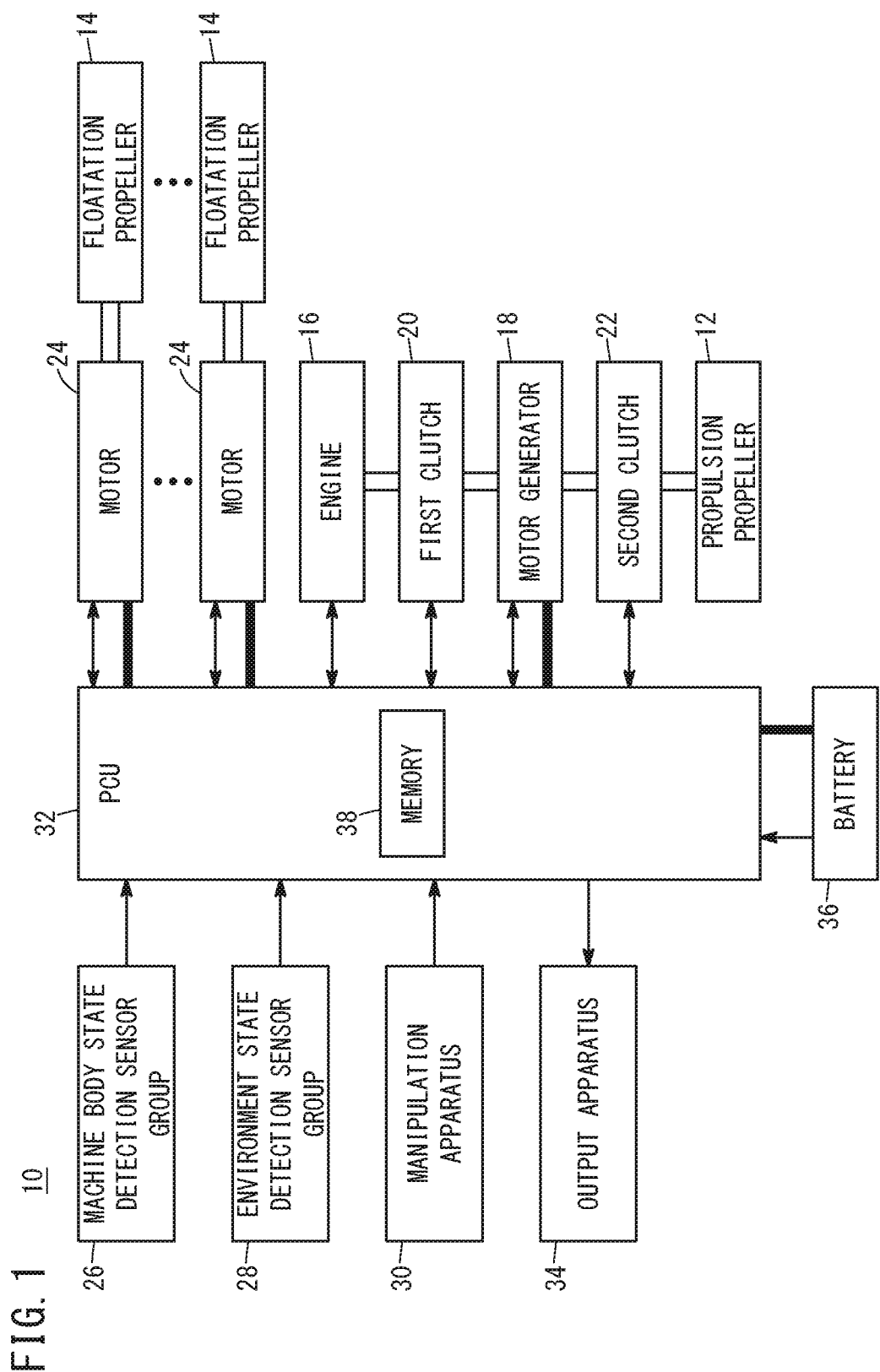

FIG. 2

| OPERATIONAL MODE | ABBREVIATION | CHARACTERISTICS | ENGINE | FIRST CLUTCH | MOTOR GENERATOR | SECOND CLUTCH |
|---|---|---|---|---|---|---|
| ENGINE DRIVE MODE | MODE A | PROPULSION PROPELLER DRIVEN DIRECTLY BY ENGINE, HIGH ENERGY CONVERSION EFFICIENCY | ON | ON | IDLE | ON |
| MOTOR DRIVE MODE | MODE B | LOW-NOISE, EASY CONTROL OF ROTATION OF PROPULSION PROPELLER | OFF | OFF | DRIVING | ON |
| ENGINE AND MOTOR DRIVE MODE | MODE C | HIGH OUTPUT POSSIBLE | ON | ON | DRIVING | ON |
| POWER GENERATION AND ENGINE DRIVE MODE | MODE D | POWER GENERATION ALSO PERFORMED WHILE DIRECTLY DRIVING PROPULSION PROPELLER WITH ENGINE | ON | ON | POWER GENERATION | ON |
| POWER GENERATION MODE | MODE E | PROPULSION PROPELLER STOPPED, ALL ENGINE OUTPUT CONVERTED INTO ELECTRICAL POWER | ON | ON | POWER GENERATION | OFF |
| STOP MODE | MODE F | STOPPED REGARDLESS OF ON/OFF STATE OF CLUTCH | OFF | ON/OFF | IDLE | ON/OFF |

FIG. 13

| MALFUNCTION LOCATION | ENGINE | FIRST CLUTCH | MOTOR GENERATOR | SECOND CLUTCH |
|---|---|---|---|---|
| ENGINE | – | (1) | (2) | (3) |
| FIRST CLUTCH | – | – | (4) | (5) |
| MOTOR GENERATOR | – | – | – | (6) |
| SECOND CLUTCH | – | – | – | – |

FIG. 14

| DOUBLE FAILURE \ FLIGHT STATE | LIFT-OFF | HOVERING FLIGHT | VERTICAL → FORWARD/ BACKWARD MOVEMENT | FORWARD/ BACKWARD ACCELERATING MOVEMENT | FORWARD/ BACKWARD MOVEMENT | FORWARD/ BACKWARD DECELERATING MOVEMENT | FORWARD/ BACKWARD → VERTICAL MOVEMENT | LANDING | PARKING |
|---|---|---|---|---|---|---|---|---|---|
| (1) | MODE F MOTOR ON | MODE F MOTOR ON | MODE B MOTOR ON | MODE B MOTOR OFF | MODE B MOTOR OFF | MODE B MOTOR OFF | MODE B MOTOR ON | MODE F MOTOR ON | MODE F MOTOR OFF |
| (2)~(6) | MODE F MOTOR ON | | | | HOVERING FLIGHT | | | MODE F MOTOR ON | MODE F MOTOR OFF |

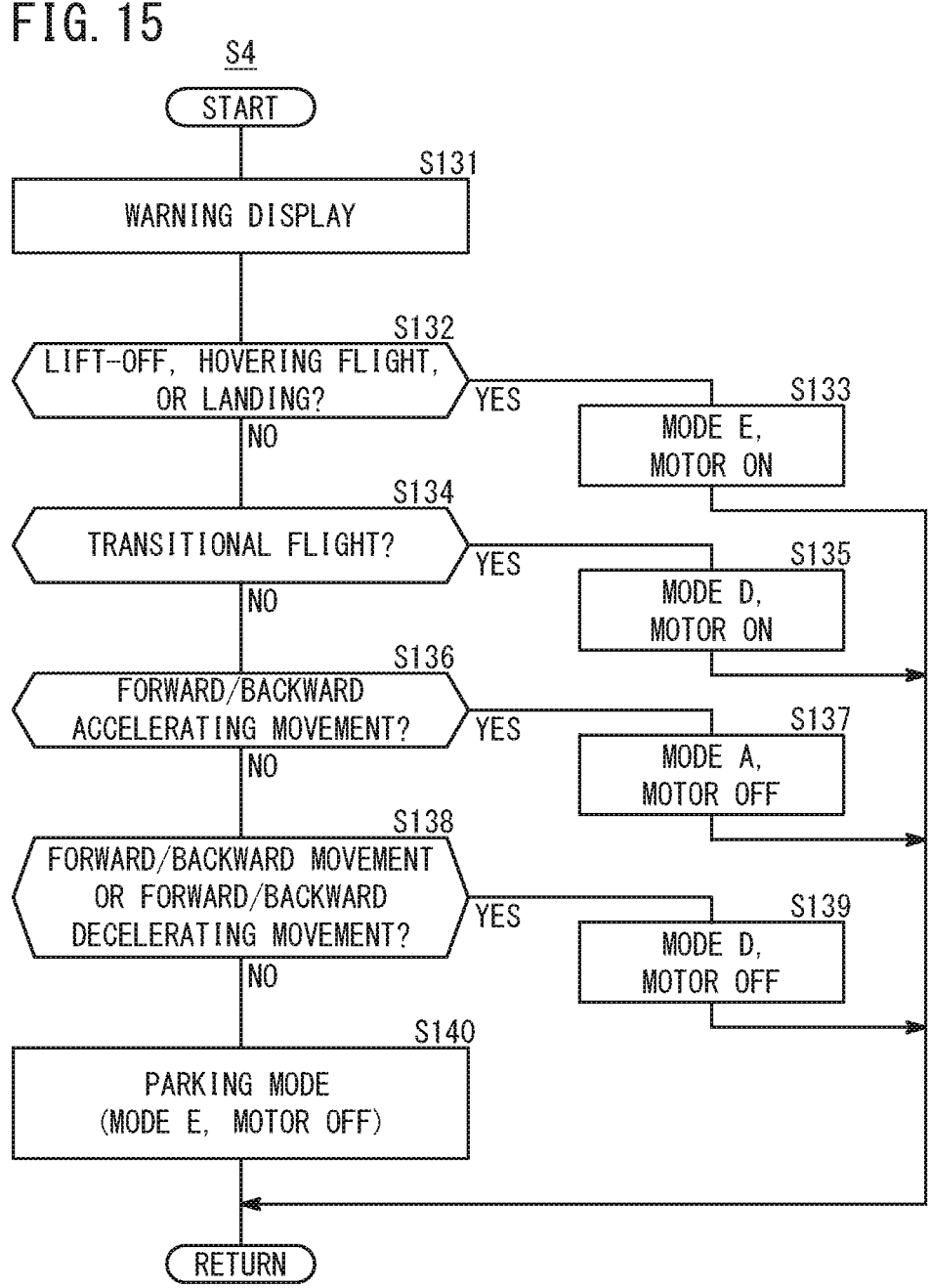

FLYING BODY WITH A CONTROL SECTION HAVING A PLURALITY OF OPERATIONAL MODES

TECHNICAL FIELD

The present invention relates to a flying body (flying object) in which a machine body thereof is propelled by a first propeller and made to float by a second propeller.

BACKGROUND ART

As an example, JP 2016-088110 A discloses that, by providing power from a battery to a plurality of electric motors to drive the electric motors, a plurality of propellers are rotated to thereby cause a multicopter to fly.

SUMMARY OF INVENTION

However, the multicopter of the above publication does not have fixed wings. Therefore, the only operational mode of the multicopter is a hover mode. As a result, when this multicopter flies, the machine body efficiency is low and it is necessary to expend a greater amount of energy.

Furthermore, in the above publication, a power generator generates electrical power by the output of the engine, and this generated power charges a main battery. Therefore, there is low energy conversion efficiency when converting the engine output into electrical power using the power generator. Accordingly, compared to a flying body that flies using the engine output, the flying velocity is low and the flight distance is short in the multicopter of the above publication. Yet further, when the motor or the like malfunctions, the multicopter cannot fly.

However, a flying body that flies by rotating a propeller with a motor, such as the multicopter in the above publication, has greater controllability than a flying body that flies using the engine output. Also, a flying body that flies using motor output creates less noise than a flying body that flies using engine output.

The present invention has been devised in order to solve this type of problem, and has the object of providing, a flying body that is capable of flying in an optimal operational state from the viewpoint of safety, noise, comfort, controllability, and cost, without requiring a complicated configuration.

An aspect of the present invention is a flying body including a first propeller that propels a machine body and an electric second propeller that causes the machine body to float. The flying body further includes an engine; a motor generator; a first clutch that connects and disconnects the engine and the motor generator; a second clutch that connects and disconnects the motor generator and the first propeller; and a control section. The control section has a plurality of operational modes in which at least one of the engine and the motor generator acts as a drive source of the first propeller. The control section controls the engine, the first clutch, the motor generator, and the second clutch, in accordance with one operational mode among the plurality of operational modes, depending on the state of the flying body.

According to the present invention, the flying body includes the engine, the motor generator, the two clutches (first clutch and second clutch), and the control section, and has a hybrid configuration in which at least one of the engine and the motor generator acts as the drive source of the first propeller. Furthermore, the control section has a plurality of operational modes, and connects or disconnects the first clutch and connects or disconnects the second clutch in an optimal operational mode, according to the state of the flying body.

Due to this, it is possible to make the flying body fly by controlling the engine, the first clutch, the motor generator, and the second clutch in the operational mode that is optimal from the viewpoints of safety, noise, comfort, controllability, and cost. As a result, it is possible to realize a flying body with a high degree of freedom of control adaptable to various situations, without adopting a complicated configuration.

BRIEF DESCRIPTION OF DRAWINGS

FIG. 1 is a configurational diagram of a flying body according to the present embodiment;

FIG. 2 shows a list of a plurality of operational modes of the PCU of FIG. 1;

FIG. 13 shows a list of multiple failure modes of FIG. 5;

FIG. 14 shows operational modes corresponding to the double failure states of FIG. 13; and FIG. 15 is a flow chart showing the details of the low-SOC mode of FIG. 4.

DESCRIPTION OF EMBODIMENTS

Figure 3:
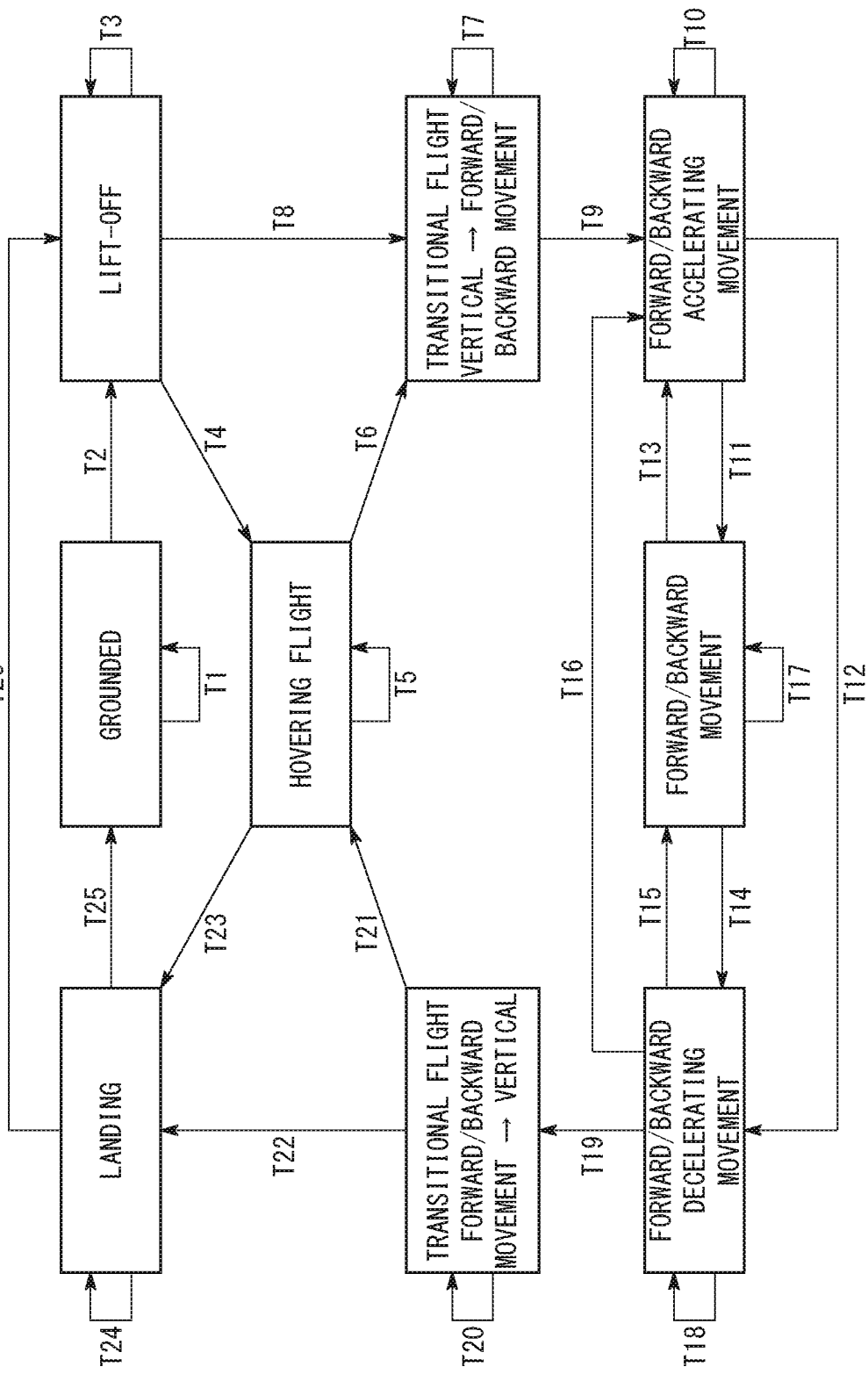
FIG. 3 is a state transition diagram of the flying body of FIG. 1.

Preferred embodiments of a flying body according to the present invention will be presented and described below with reference to the accompanying drawings.

[1. Configuration of the Present Embodiment]

As shown in FIG. 1, a flying body 10 according to the present embodiment is applied to a manned vertical take-off and landing aircraft, and includes a propulsion propeller 12 (first propeller) that propels a machine body and an electric floatation propeller 14 (second propeller) that causes the machine body to float. FIG. 1 shows a case in which the flying body 10 includes one propulsion propeller 12 and a plurality of floatation propellers 14. In the present embodiment, the flying body 10 may include at least one propulsion propeller 12 and at least one floatation propeller 14. Accordingly, the present embodiment is applicable to a flying body including a plurality of propulsion propellers 12 and a plurality of flotation propellers 14, as well as to a flying body that includes a plurality of propulsion propellers 12 and one floatation propeller 14.

The flying body 10 includes, as a drive mechanism for driving the propulsion propeller 12, an engine 16, a motor generator 18, a first clutch 20 that connects and disconnects the engine 16 and the motor generator 18, and a second clutch 22 that connects and disconnects the motor generator 18 and the propulsion propeller 12. Here, the engine 16, the first clutch 20, the motor generator 18, and the second clutch 22 are arranged in the stated order from the engine 16 toward the propulsion propeller 12.

In the flying body 10, due to the connection or disconnection by the first clutch 20 and the second clutch 22, at least one of the engine 16 and the motor generator 18 functions as a drive source of the propulsion propeller 12 to rotate the propulsion propeller 12. Accordingly, the flying body 10 is a flying body with a hybrid configuration for the propulsion propeller 12 including two types of drive sources: the engine 16 and the motor generator 18. Furthermore, the flying body 10 includes a plurality of motors 24 serving as drive sources for rotating the plurality of floatation propellers 14.

The configurations of the engine 16, the motor generator 18, the first clutch 20, the second clutch 22, and the plurality of motors 24 are widely known, and therefore detailed descriptions thereof are omitted here. Furthermore, in the present embodiment, the engine 16 is a broad concept including various engines such as a reciprocating engine, a rotary engine, and a gas turbine engine.

The flying body 10 further includes a machine body state detection sensor group 26, an environment state detection sensor group 28, a manipulation apparatus 30, a PCU (power control unit) 32, an output apparatus 34, and a battery 36.

The machine body state detection sensor group 26 includes various sensors that sequentially detect the states of various types of detection targets included in the flying body 10 and output these detection results to the PCU 32.

Specifically, the sensors relating to the engine 16 include various sensors that detect the rotational velocity, temperature (exhaust temperature, cooling water temperature, lubricating oil temperature, fuel temperature), pressure (cooling water pressure, oil pressure, fuel pressure, in-cylinder pressure), air-fuel ratio, and injector and spark plug voltages of the engine 16.

The sensors relating to the first clutch 20 include various sensors that detect the rotational velocity on the engine 16 side, the rotational velocity of the motor generator 18 side, and the hydraulic pressure of the valve controlling the first clutch 20. The sensors relating to the second clutch 22 include various sensors that detect the rotational velocity on the motor generator 18 side, the rotational velocity of the propulsion propeller 12 side, and the hydraulic pressure of the valve controlling the second clutch 22.

The sensors relating to the motor generator 18 and the motors 24 include various sensors that detect the rotational velocity, temperature (stator temperature, magnet temperature, switching element temperature), and coil voltage and current.

The sensors relating to the battery 36 include various sensors that detect the SOC (State Of Charge), voltage, temperature, and the like.

The environment state detection sensor group 28 includes various sensors that detect the surrounding environment of the flying body 10 and output these detection results to the PCU 32. The environment state detection sensor group 28 includes various sensors that detect the outside atmosphere temperature, the altitude of the flying body 10, and the like, for example.

The manipulation apparatus 30 is a control stick or handle for instructing the PCU 32 to put the flying body 10 into a desired state (operational state or flying state), by being manipulated by a rider who is riding on the flying body 10. Accordingly, the manipulation apparatus 30 issues instructions to the PCU 32 for the output (necessary output or requested output) needed for the propulsion propeller 12 and the floatation propellers 14. The output apparatus 34 is a display apparatus or an audio apparatus such as a speaker, and outputs determination results or the like by the PCU 32 to the outside.

The battery 36 supplies electrical power to each section of the flying body 10, via the PCU 32. Furthermore, when power is generated by the motor generator 18, this generated power charges the battery 36 via the PCU 32. In FIG. 1, the flow of signals is indicated by thin arrows, and the flow of electrical power supply is indicated by thick solid lines.

The PCU 32 functions as a control section of the flying body 10, by executing a program stored in a memory 38 inside this PCU 32. Essentially, the PCU 32 controls the engine 16, the first clutch 20, the motor generator 18, and the second clutch 22 to rotate the propulsion propeller 12 and controls the motors 24 to rotate the floatation propellers 14, based on instructions (requested power output) from the manipulation apparatus 30 and the detection results of the machine body state detection sensor group 26 and environment state detection sensor group 28. Furthermore, the PCU 32 controls the supply of electrical power from the battery 36 to each section of the flying body 10 and the charging of the battery 36 when the motor generator 18 functions as a power generator. The details of this control method are described further below.

[2. Operational Modes of the Propulsion Propeller 12]

The PCU 32 has a plurality of operational modes relating to the propulsion propeller 12 when at least one of the engine 16 and the motor generator 18 is used as a drive source for this propulsion propeller 12. The plurality of operational modes are stored in the memory 38 in the PCU 32, for example. FIG. 2 shows a list of a plurality of operational modes. The PCU 32 (see FIG. 1) selects one operational mode from among the plurality of operational modes, according to the state of the flying body 10, and controls the engine 16, the first clutch 20, the motor generator 18, and the second clutch 22 in accordance with the selected operational mode. The PCU 32 can recognize the state of the flying body 10 and the required output, based on the instructions from the manipulation apparatus 30, the detection results of the machine body state detection sensor group 26, and the detection results of the environment state detection sensor group 28.

Here, the plurality of operational modes are an engine drive mode (also referred to below as mode A), a motor drive mode (also referred to below as mode B), an engine and motor drive mode (also referred to below as mode C), a power generation and engine drive mode (also referred to below as mode D), a power generation mode (also referred to below as mode E), and a stop mode (also referred to below as mode F).

Mode A is an operational mode for realizing a flight state with high energy conversion efficiency for the propulsion propeller 12, by directly driving the propulsion propeller 12 with the engine 16. Essentially, mode A is an operational mode for realizing a flight state that is highly cost-efficient. In mode A, the first clutch 20 and the second clutch 22 are in a connected state (ON) and the motor generator 18 is in an idle state. Therefore, the engine 16 acting as the drive source causes the propulsion propeller 12 to rotate via the first clutch 20, the motor generator 18 that is in the idle state, and the second clutch 22. Accordingly, in mode A, the motor generator 18 transmits the output of the engine 16 as-is to the propulsion propeller 12.

Mode B is an operational mode for realizing a flight state in which the rotational control of the propulsion propeller 12 can be easily achieved, with relatively low noise, by stopping the driving of the engine 16 and driving the propulsion propeller 12 with the motor generator 18. Essentially, mode B is an operational mode for realizing a flight state with high controllability and responsivity. In mode B, the first clutch 20 is in the disconnected state (OFF), whereas the second clutch 22 is in the connected state. Therefore, the motor generator 18 acting as the drive source causes the propulsion propeller 12 to rotate via the second clutch 22.

Mode C is an operational mode for realizing a flight state in which the engine 16 and the motor generator 18 both drive the propulsion propeller 12, thereby achieving a relatively high output. Essentially, mode C is an operational mode for realizing a flight state with good cost-efficiency. In mode C, the first clutch 20 and the second clutch 22 are in the connected state. Therefore, the engine 16 and the motor generator 18 acting as the drive sources cause the propulsion propeller 12 to rotate via the first clutch 20 and the second clutch 22. As a result, it is possible to rotate the propulsion propeller 12 with the output of the engine 16 and to, according to the required output, provide assistance to the output of the engine 16 with the motor generator 18.

Mode D is an operational mode for realizing a flight state in which the propulsion propeller 12 is directly driven by the engine 16, and the motor generator 18 generates electrical power. In mode D, the first clutch 20 and the second clutch 22 are in the connected state. Therefore, the engine 16 serving as the drive source rotates the propulsion propeller 12 via the first clutch 20 and the second clutch 22, and the motor generator 18 is caused to function as a power generator, by using the output of the engine 16. As a result, it is possible to rotate the propulsion propeller 12 with the output of the engine 16 and to, according to the required output, cause the motor generator 18 to generate electrical power.

Mode E is an operational mode in which the rotation of the propulsion propeller 12 is stopped and the motor generator 18 functions as a power generator, thereby converting all of the output of the engine 16 into electrical power. In mode E, the first clutch 20 is in the connected state, whereas the second clutch 22 is in the disconnected state. Therefore, the output of the engine 16 is not transmitted to the propulsion propeller 12, and is instead converted into electrical power by the motor generator 18.

Mode F is an operational mode in which the engine 16 and the motor generator 18 are stopped, thereby stopping the rotation of the propulsion propeller 12. In mode F, the first clutch 20 and the second clutch 22 may be in either the connected state or the disconnected state. In this case, the motor generator 18 is in an idle state.

As described in detail further below, in mode E and mode F, the plurality of floatation propellers 14 are rotated by being driven by the plurality of motors 24. In such a case, the flying body 10 floats up or hovers in the air in a low-noise state.

[3. Basic Operation of the Flying Body 10]

The following describes the basic operation of the flying body 10, while referencing the state transition diagram of FIG. 3. FIG. 3 shows the transitions among a series of state, such as landing, lift-off, and forward/backward flying of the flying body 10 (see FIG. 1). The description concerning FIG. 3 deals mainly with the transitions among states (operational state and flying state) of the flying body 10, and there are cases where descriptions of the operations of individual configurational elements forming the flying body 10 are simplified or omitted. Furthermore, the actor performing control in this state transition diagram is the PCU 32.

First, in a "grounded" state (also referred to below as a "parked" state), the flying body 10 is resting on the ground. The transition line T1 indicates a case where the flying body 10 remains in the parked state. Here, when the rider gets on the flying body 10 and manipulates the manipulation apparatus 30 to provide instructions for lift-off to the PCU 32, the flying body 10 rises up from the ground and transitions to the "lift-off" state, as shown by the transition line T2. After this, as shown by the transition line T3, the flying body 10 rises up to a target altitude by maintaining the lift-off state.

Next, after the flying body 10 has reached the target altitude, when the rider manipulates the manipulation apparatus 30 to provide instructions for hovering flight to the PCU 32, the flying body 10 transitions to hovering flight, as shown by the transition line T4. As shown by the transition line T5, in a case where the hovering flight is maintained, the PCU 32 controls each section in the flying body 10 to keep the velocity at 0. The PCU 32 maintains the hovering flight by controlling the roll angle, pitch angle, yaw rate, and altitude of the flying body 10.

Next, in a case where the rider manipulates the manipulation apparatus 30 to provide instructions for forward/backward flight (flying forwards or backwards) of the flying body 10 to the PCU 32, the flying body 10 transitions to a flight state (also referred to below as transitional flight) for transitioning from hovering flight to forward/backward flight at the target altitude, as shown by the transition line T6. During transitional flight, the flying body 10 remains in the state of the transition line T7. The flying body 10 is also capable of transitioning from the lift-off state to the transitional flight, as shown by the transition line T8.

After this, when the rider manipulates the manipulation apparatus 30 to provide instructions for acceleration flight of the flying body 10 to the PCU 32, the flight state transitions from the transitional flight to "forward/backward accelerating movement", as shown by the transition line T9. Forward/backward accelerating movement refers to the flying body 10 moving forward or backward while accelerating, at the target altitude. In a case where the forward/backward accelerating movement flight state is maintained, the state indicated by the transition line T10 continues.

After this, when the rider manipulates the manipulation apparatus 30 to provide instructions for constant velocity flight of the flying body 10 to the PCU 32, a transition is made from the forward/backward accelerating movement to a constant velocity flight state of "forward/backward movement", as shown by the transition line T11. In the following description, the "forward/backward movement" of the constant velocity flight may be referred to as "forward/backward movement with substantially constant velocity". Furthermore, when the rider manipulates the manipulation apparatus 30 to provide instructions for deceleration flight of the flying body 10 to the PCU 32, a transition is made from the forward/backward accelerating movement to a flight state of "forward/backward decelerating movement", as shown by the transition line T12. The forward/backward decelerating movement refers to the flying body 10 moving forward or backward while decelerating, at the target altitude.

In each type of flight state having forward/backward movement at the target altitude, which are the "forward/backward movement", "forward/backward accelerating movement", and "forward/backward decelerating movement", it is possible to transition to another one of these flight states in response to the manipulation of the manipulation apparatus 30 by the rider, as shown by transition lines T13 to T16. In a case where the "forward/backward movement" flight state is maintained, the state of the transition line T17 is maintained. In a case where the "forward/backward decelerating movement" flight state is maintained, the state of the transition line T18 is maintained.

After this, when the rider manipulates the manipulation apparatus 30 to provide instructions for vertical flight of the flying body 10 to the PCU 32, the flying body 10 transitions to a flight state for transitioning from the forward/backward decelerating movement flight state to a vertical flight state, as shown by the transition line T19. In the description below, this state transition is also referred to as "transitional flight". In a case where this transitional flight is maintained, the state of the transition line T20 is maintained.

After this, according to a manipulation of the manipulation apparatus 30 by the rider, the flying body 10 transitions from the transitional flight to the hovering flight, as shown by the transition line T21, or transitions from the transitional flight to the "landing" state to land on the ground from the target altitude, as shown by the transition line T22. In the case where the transition to the hovering flight is made, after this, when the rider manipulates the manipulation apparatus 30 to provide instructions for landing, the flying body 10 transitions from the hovering flight to the "landing" state, as shown by the transition line T23. In a case where "landing" is maintained, the state of the transition line 124 is maintained.

When the flying body 10 lands on the ground, the flying body 10 transitions from the landing flight to the grounded (parked) state, as shown by the transition line T25. Furthermore, the flying body 10 can transition from the landing flight to the lift-off flight, as shown by the transition line T26, in response to a manipulation of the manipulation apparatus 30 by the rider.

In FIG. 3, in the "lift-off", "hovering flight", and "landing" operational states (flight states), the PCU 32 (see FIG. 1) controls the plurality of motors 24 to rotate the plurality of floatation propellers 14, to cause the flying body 10 to fly vertically. Furthermore, in the "forward/backward movement", "forward/backward accelerating movement", and "forward/backward decelerating movement" operational states (flight states), the PCU 32 controls the engine 16, the first clutch 20, the motor generator 18, and the second clutch 22 to rotate the propulsion propeller 12, to cause the flying body 10 to fly forward/backward. Furthermore, in the two "transitional flight" operational states, a transition is made from the vertical flight realized by the floatation propellers 14 to the forward/backward flight realized by the propulsion propeller 12 or from the forward/backward flight realized by the propulsion propeller 12 to the vertical flight realized by the floatation propellers 14.

[4. Flight Control of the Flying Body 10 by the PCU 32]

The following describes flight control of the flying body 10 by the PCU 32, while referencing FIGS. 4 to 15. Here, a case is described in which the PCU 32 selects a suitable operational mode from among the plurality of operational modes, according to the state of the flying body 10, and, in accordance with the selected operational mode, controls the engine 16, the first clutch 20, the motor generator 18, and the second clutch 22 to rotate the propulsion propeller 12 and controls the motors 24 to rotate the floatation propellers 14. The control for the engine 16, the first clutch 20, the motor generator 18, and the second clutch 22 and the control for the plurality of motors 24 in each operational mode, as well as operations of the propulsion propeller 12 and the plurality of flotation propellers 14 due to these controls, have already been described in relation to FIG. 2. Therefore, the following description focuses mainly on the method by which the PCU 32 selects the operational mode.

<4.1 Control in a Normal State>

First, control of the flying body 10 by the PCU 32 in a case where the flying body 10 is in a normal state will be described, while referencing FIG. 4. A normal state refers to a state in which the SOC is greater than or equal to a threshold value and failures such as a malfunction or abnormality have not occurred in the flying body 10, for example.

Figure 4:
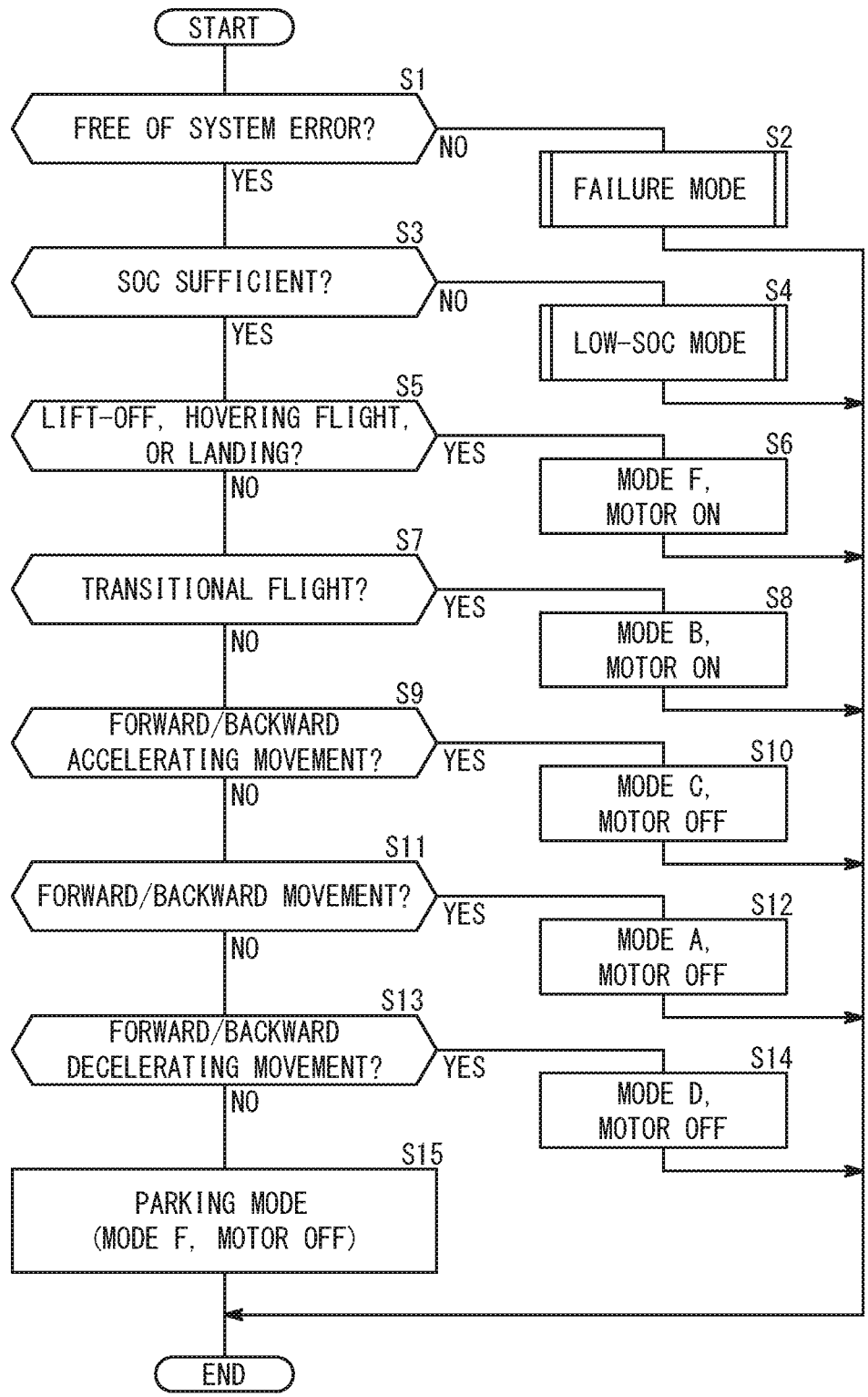
FIG. 4 is a flow chart showing processing of the PCU of FIG. 1.

At step S1 of FIG. 4, the PCU 32 (see FIG. 1) judges whether a system error (failure) such as a malfunction or abnormality has occurred in each section of the flying body 10, based on the detection results of the machine body state detection sensor group 26 and the environment state detection sensor group 28. A system error refers to a failure in detection targets (e.g., the engine 16) of the machine body state detection sensor group 26 and the environment state detection sensor group 28.

At step S1, if there is a system error (step S1: NO), the process moves to the failure mode of step S2. The process performed in the failure mode is described in FIGS. 5 to 14.

On the other hand, at step S1, if there is no system error (step S1: YES), the PCU 32 moves to step S3 and judges whether the SOC of the battery 36 is greater than or equal to the threshold value or not, based on the detection results of the machine body state detection sensor group 26.

At step S3, if the SOC is less than the threshold value (step S3: NO), the PCU 32 judges the SOC to be insufficient and moves to the low-SOC mode of step S4. The processing in the low-SOC mode is described in FIG. 15.

On the other hand, at step S3, if the SOC is greater than or equal to the threshold value (step S3: YES), the PCU 32 moves to step S5 and judges whether the current operational state (flight state) of the flying body 10 is lift-off, hovering flight, or landing or not, based on instructions from the manipulation apparatus 30 and detection results of the machine body state detection sensor group 26 and the environment state detection sensor group 28.

At step S5, if the flight state is lift-off, hovering flight, or landing (step S5: YES), the PCU 32 moves to step S6, selects mode F (see FIG. 2) by referencing the memory 38, and drives (turns ON) the motors 24.

At step S5, if the flight state is not lift-off, hovering flight, or landing (step S5: NO), the PCU 32 moves to step S7 and judges whether the current flight state is transitional flight.

At step S7, if the flight state is transitional flight (step S7; YES), the PCU 32 moves to step S8, selects mode B by referencing the memory 38, and drives the motors 24.

At step S7, if the flight state is not transitional flight (step S7: NO), the PCU 32 moves to step S9 and judges whether the current flight state is forward/backward accelerating movement.

At step S9, if the flight state is forward/backward accelerating movement (step S9: YES), the PCU 32 moves to step S10, selects mode C by referencing the memory 38, and stops (turns OFF) the driving of the motors 24.

At step S9, if the flight state is not forward/backward accelerating movement (step S9: NO), the PCU 32 moves to step S11 and judges whether the current flight state is forward/backward movement with substantially constant velocity.

At step S11, if the flight state is forward/backward movement with substantially constant velocity (step S11: YES), the PCU 32 moves to step S12, selects mode A by referencing the memory 38, and stops the driving of the motors 24.

At step S11, if the flight state is not forward/backward movement with substantially constant velocity (step S11: NO), the PCU 32 moves to step S13 and judges whether the current flight state is backward/forward decelerating movement.

At step S13, if the flight state is backward/forward decelerating movement (step S13: YES), the PCU 32 moves to step S14, selects mode D by referencing the memory 38, and stops the driving of the motors 24.

At step S13, if the flight state is not backward/forward decelerating movement (step S13: NO), the PCU 32 moves to step S15, judges that the current flight state is the parking mode (grounded state of FIG. 3), selects mode F by referencing the memory 38, and stops the driving of the motors 24.

In this way, in a case where the flying body 10 is in a normal state, the PCU 32 basically selects a suitable operational mode from the memory 38 according to the corresponding flight state. Due to this, the PCU 32 controls the engine 16, the first clutch 20, the motor generator 18, and the second clutch 22 to rotate the propulsion propeller 12, in accordance with the selected operational mode, and controls the motors 24 to rotate the floatation propellers 14.

<4.2 Control in the Failure Mode>

Figure 5:
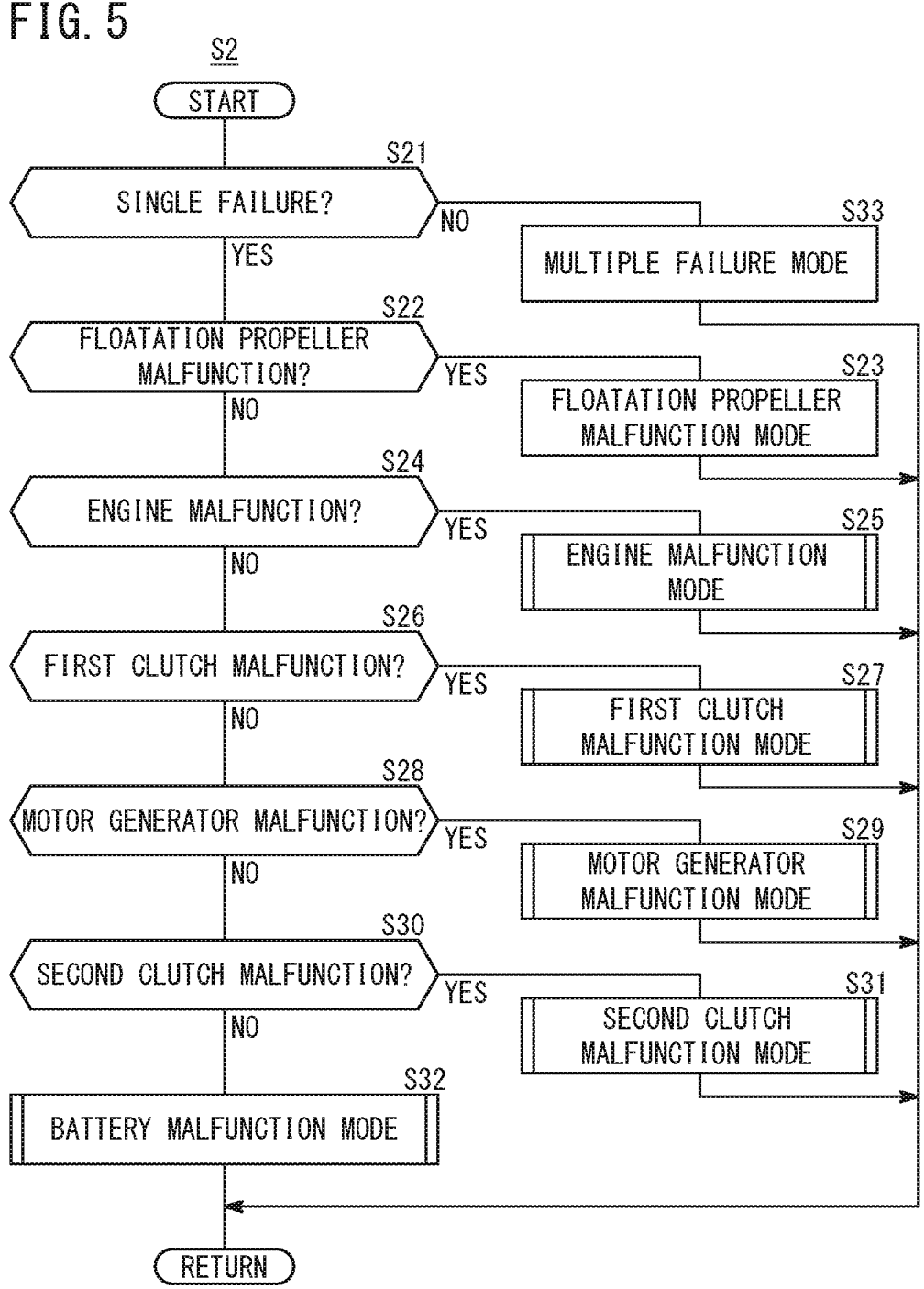
FIG. 5 is a flow chart showing the details of the failure mode of FIG. 4.

The following describes control of the PCU 32 in a case where the flying body 10 is in a malfunctioning state or abnormal state (failure mode), while referencing FIG. 5.

At step S21 of FIG. 5, the PCU 32 (see FIG. 1) judges whether a system error such as a malfunction of the flying body 10 is a single failure state at a single location, based on the detection results of the machine body state detection sensor group 26 and the environment state detection sensor group 28. If the system error is a single failure state (step S21: YES), the process moves to step S22.

At step S22, the PCU 32 judges whether the single failure is a malfunction of a floatation propeller 14. In such a case, the judgment concerning whether there is a malfunction in the floatation propeller 14 is made based on the rotational velocity, temperature (stator temperature, magnet temperature, or switching element temperature), and coil voltage and current of the motor 24 driving this floatation propeller 14. If there is a malfunction in the floatation propeller 14 (step S22: YES), the process moves to step S23. At step S23, the PCU 32 transitions to a floatation propeller malfunction mode, and since the floatation propeller 14 is malfunctioning, controls each section of the flying body 10 to land the flying body 10.

At step S22, if the floatation propeller 14 is not malfunctioning (step S22: NO), the PCU 32 moves to step S24 and judges whether the single failure is a malfunction in the engine 16. In this case, the judgement of whether there is a malfunction in the engine 16 is made based on the rotational velocity, the temperature (exhaust temperature, cooling water temperature, lubricating oil temperature, or fuel temperature), pressure (cooling water pressure, oil pressure, fuel pressure, in-cylinder pressure), air-fuel ratio, and injector and spark plug voltages of the engine 16. If there is a malfunction in the engine 16 (step S24: YES), the PCU 32 moves to step S25, transitions to the engine malfunction mode, and performs control of each section of the flying body 10 corresponding to the malfunction of the engine 16. The details of the engine malfunction mode are described in FIG. 6.

At step S24, if there is no malfunction in the engine 16 (step S24: NO), the PCU 32 moves to step S26 and judges whether the single failure is a malfunction in the first clutch 20. In such a case, the judgment of whether there is a malfunction in the first clutch 20 is made based on the rotational velocity of the first clutch 20 on the engine 16 side, the rotational velocity of the first clutch 20 on the motor generator 18 side, and the hydraulic pressure of the valve controlling the first clutch 20. If there is a malfunction in the first clutch 20 (step S26: YES), the PCU 32 moves to step S27, transitions to a first clutch malfunction mode, and performs control of each section of the flying body 10 corresponding to the malfunction in the first clutch 20. The details of the first clutch malfunction mode are described in FIGS. 7 and 8.

At step S26, if there is no malfunction in the first clutch 20 (step S26: NO), the PCU 32 moves to step S28 and judges whether the single failure is a malfunction in the motor generator 18. In such a case, the judgment concerning whether there is a malfunction in the motor generator 18 is made based on the rotational velocity, temperature (stator temperature, magnet temperature, or switching element temperature), and coil voltage and current of the motor generator 18. If there is a malfunction in the motor generator 18 (step S28: YES), the PCU 32 moves to step S29, transitions to a motor generator malfunction mode, and performs control of each section of the flying body 10 corresponding to the malfunction in the motor generator 18. The details of the motor generator malfunction mode are described in FIG. 9.

At step S28, if there is no malfunction in the motor generator 18 (step S28: NO), the PCU 32 moves to step S30 and judges whether the single failure is a malfunction in the second clutch 22. In such a case, the judgment of whether there is a malfunction in the second clutch 22 is made based on the rotational velocity of the second clutch 22 on the motor generator 18 side, the rotational velocity of the second clutch 22 on the propulsion propeller 12 side, and the hydraulic pressure of the valve controlling the second clutch 22. If there is a malfunction in the second clutch 22 (step S30: YES), the PCU 32 moves to step S31, transitions to a second clutch malfunction mode, and performs control of each section of the flying body 10 corresponding to the malfunction in the second clutch 22. The details of the second clutch malfunction mode are described in FIGS. 10 and 11.

At step S30, if there is no malfunction in the second clutch 22 (step S30: NO), the PCU 32 moves to step S32, judges that the single failure is a malfunction in the battery 36, transitions to a battery malfunction mode, and performs control of each section of the flying body 10 corresponding to the malfunction in the battery 36. The details of the battery malfunction mode are described in FIG. 12. The PCU 32 may make the judgment about the malfunction in the battery 36 based on the SOC, voltage, temperature, and the like of the battery 36.

At step S21, if the system error is not a single failure (step S21: NO), the PCU 32 judges that there is a multiple failure of abnormalities or malfunctions at two or more locations, and moves to step S33. At step S33, the PCU 32 transitions to a multiple failure mode, and performs control of each section of the flying body 10 corresponding to the malfunctions at a plurality of locations. The details of the multiple failure mode are described in FIGS. 13 and 14.

The following describes the details of each malfunction mode and the multiple failure mode, in order.

(4.2.1 Engine Malfunction Mode)

Figure 6:
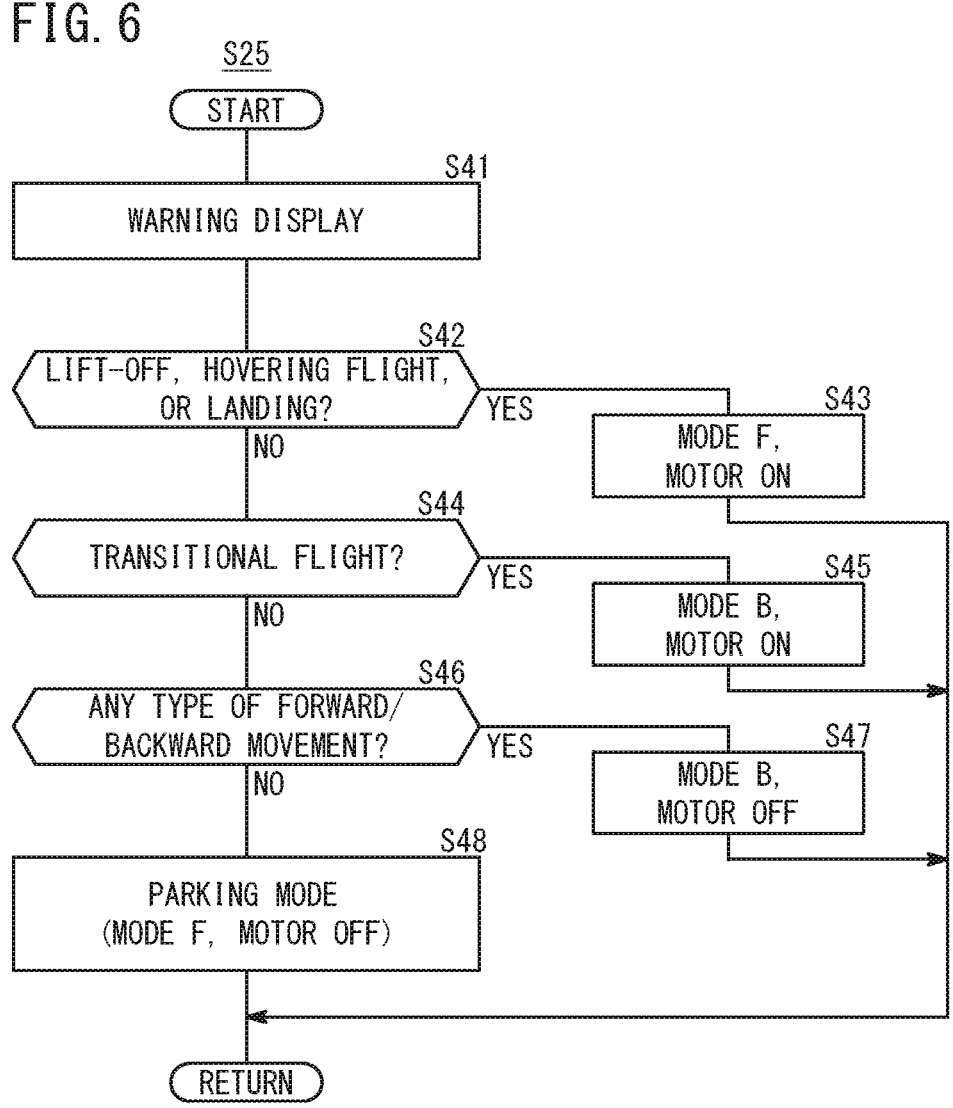
FIG. 6 is a flow chart showing the details of the engine malfunction mode of FIG. 5.

The details of the engine malfunction mode are described while referencing FIG. 6.

First, at step S41 of FIG. 6, the PCU 32 (see FIG. 1) provides notification about the malfunctioning of the engine 16 to the outside, via the output apparatus 34. For example, if the output apparatus 34 is a display apparatus, the PCU 32 displays information indicating that the engine 16 is malfunctioning on a screen of the display apparatus, to warn the rider.

Next, at step S42, the PCU 32 judges whether the current operational state (flight state) of the flying body 10 is lift-off, hovering flight, or landing or not. If the flight state is lift-off, hovering flight, or landing (step S42: YES), the PCU 32 moves to step S43, selects mode F (see FIG. 2) by referencing the memory 38, and drives (turns ON) the motors 24.

At step S42, if the flight state is not lift-off, hovering flight, or landing (step S42: NO), the PCU 32 moves to step S44 and judges whether the current flight state is transitional flight, based on instructions from the manipulation apparatus 30 and detection results of the machine body state detection sensor group 26 and the environment state detection sensor group 28.

At step S44, if the flight state is transitional flight (step S44: YES), the PCU 32 moves to step S45, selects mode B by referencing the memory 38, and drives the motors 24.

At step S44, if the flight state is not transitional flight (step S44: NO), the PCU 32 moves to step S46 and judges whether the current flight state is a type of forward/backward movement (forward/backward accelerating movement, forward/backward movement with a substantially constant velocity, or forward/backward decelerating movement).

At step S46, if the flight state is any type of forward/backward movement (step S46: YES), the PCU 32 moves to step S47, selects mode B by referencing the memory 38, and stops (turns OFF) the driving of the motors 24.

At step S46, if the flight status is none of the types of forward/backward movement (step S46: NO), the PCU 32 moves to step S48, judges that the current flight state is the parking mode (grounded state of FIG. 3), selects mode F by referencing the memory 38, and stops the driving of the motors 24.

In this way, in a case where the flying body 10 is in the engine malfunction mode, the PCU 32 drives the motor generator 18 to rotate the propulsion propeller 12 when there is transitional flight or any type of forward/backward movement (mode B of steps S45 and S47). Due to this, the PCU 32 controls the first clutch 20, the motor generator 18, and the second clutch 22 to rotate the propulsion propeller 12, in accordance with the selected operational mode, and controls the motors 24 to rotate the floatation propellers 14.

(4.2.2 First Clutch Malfunction Mode)

Figure 7:
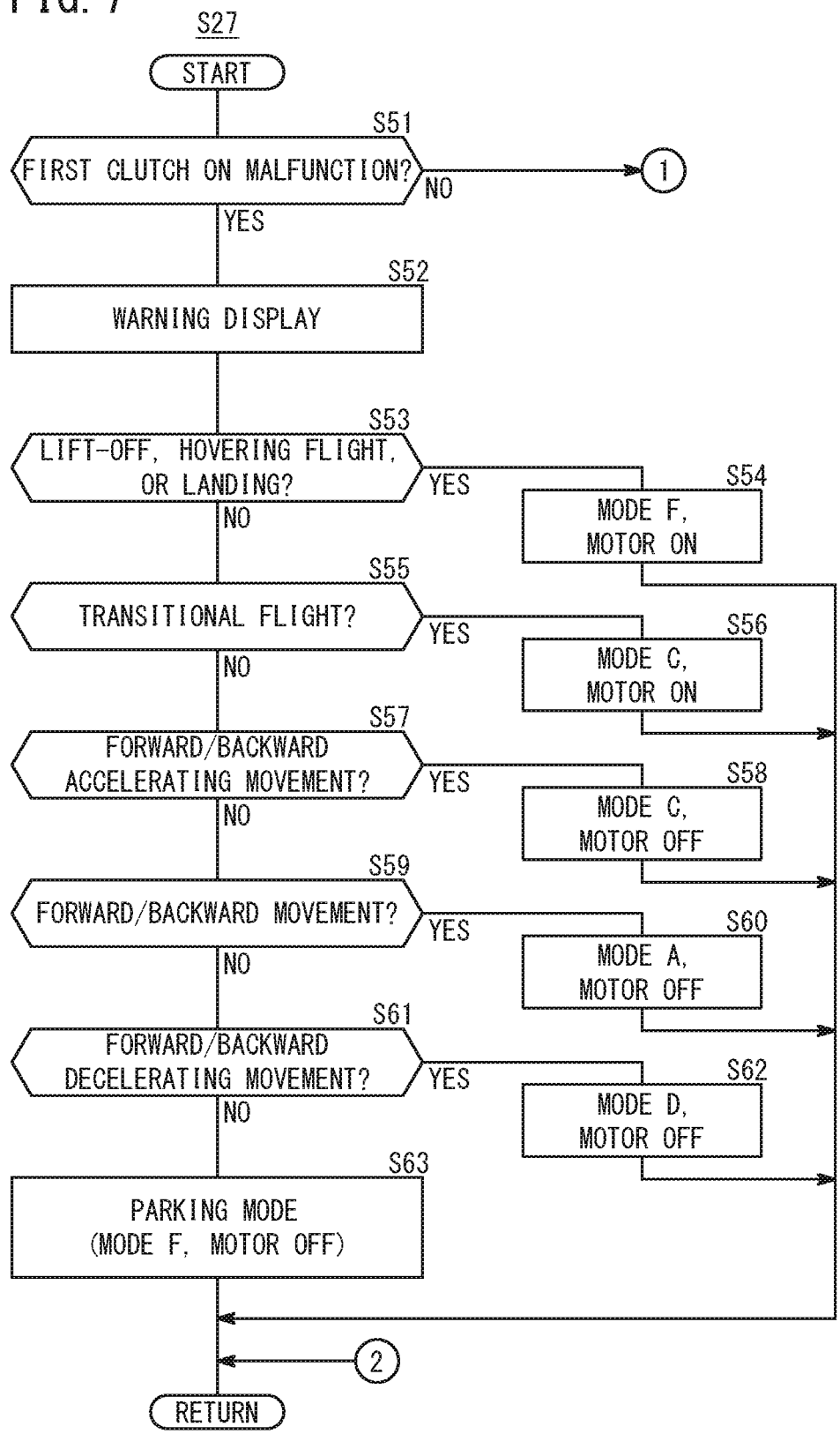
FIG. 7 is a flow chart showing the details of the first clutch malfunction mode of FIG. 5.
Figure 8:
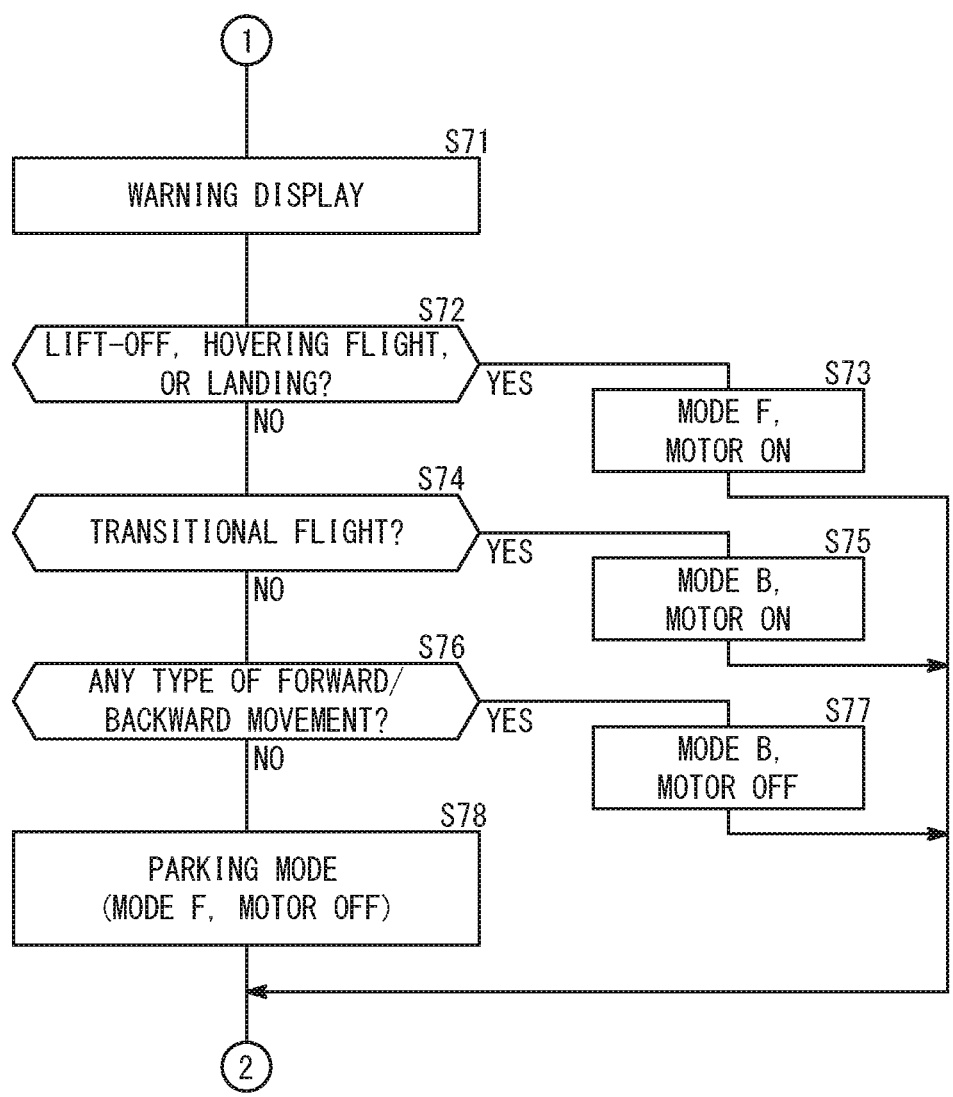
FIG. 8 is a flow chart showing the details of the first clutch malfunction mode of FIG. 5.

The details of the first clutch malfunction mode are described while referencing FIGS. 7 and 8.

First, at step S51 of FIG. 7, the PCU 32 (see FIG. 1) judges whether the malfunction in the first clutch 20 is a malfunction (ON malfunction) of remaining in the connected state despite instruction for disconnection being issued from the PCU 32 to the first clutch 20. If the malfunction is an ON malfunction (step S51: YES), the PCU 32 moves to step S52 and provides notification (warning display) that the first clutch 20 has an ON malfunction to the rider, via the output apparatus 34.

Next, at step S53, the PCU 32 judges whether the current operational state (flight state) of the flying body 10 is lift-off, hovering flight, or landing or not. If the flight state is lift-off, hovering flight, or landing (step S53: YES), the PCU 32 moves to step S54, selects mode F (see FIG. 2) by referencing the memory 38, and drives (turns ON) the motors 24.

At step S53, if the flight state is not lift-off, hovering flight, or landing (step S53: NO), the PCU 32 moves to step S55 and judges whether the current flight state is transitional flight, based on instructions from the manipulation apparatus 30 and detection results of the machine body state detection sensor group 26 and the environment state detection sensor group 28.

At step S55, if the flight state is transitional flight (step S55: YES), the PCU 32 moves to step S56, selects mode C by referencing the memory 38, and drives the motors 24.

At step S55, if the flight state is not transitional flight (step S55: NO), the PCU 32 moves to step S57 and judges whether the current flight state is forward/backward accelerating movement.

At step S57, if the flight state is forward/backward accelerating movement (step S57: YES), the PCU 32 moves to step S58, selects mode C by referencing the memory 38, and stops (turns OFF) the driving of the motors 24.

At step S57, if the flight state is not forward/backward accelerating movement (step S57: NO), the PCU 32 moves to step S59 and judges whether the current flight state is forward/backward movement with substantially constant velocity.

At step S59, if the flight state is forward/backward movement with substantially constant velocity (step S59: YES), the PCU 32 moves to step S60, selects mode A by referencing the memory 38, and stops the driving of the motors 24.

At step S59, if the flight state is not forward/backward movement with substantially constant velocity (step S59: NO), the PCU 32 moves to step S61 and judges whether the current flight state is backward/forward decelerating movement.

At step S61, if the flight state is backward/forward decelerating movement (step S61: YES), the PCU 32 moves to step S62, selects mode D by referencing the memory 38, and stops the driving of the motors 24.

At step S61, if the flight state is not forward/backward decelerating movement (step S61: NO), the PCU 32 moves to step S63, judges that the current flight state is the parking mode, selects mode F by referencing the memory 38, and stops the driving of the motors 24.

In this way, in the case of the ON malfunction of the first clutch 20, the PCU 32 rotates the propulsion propeller 12 in an operational mode using the output of the engine 16 or generates electrical power with the motor generator 18, when there is transitional flight or any type of forward/backward movement (modes C, A, and D of steps S56, S58, S60, and S62). In this case as well, the PCU 32 can control the engine 16, the motor generator 18, and the second clutch 22 to rotate the propulsion propeller 12, in accordance with the selected operational mode, and control the motors 24 to rotate the floatation propellers 14.

On the other hand, at step S51, if the malfunction of the first clutch 20 is a malfunction (OFF malfunction) of not transitioning to the connected state despite instruction for connection being issued from the PCU 32 to the first clutch 20 (step S51: NO), the process moves to step S71 of FIG. 8. At step S71, the PCU 32 (see FIG. 1) provides notification (warning display) that the first clutch 20 has an OFF malfunction to the rider, via the output apparatus 34.

Next, at step S72, the PCU 32 judges whether the current operational state (flight state) of the flying body 10 is lift-off, hovering flight, or landing or not. If the flight state is lift-off, hovering flight, or landing (step S72: YES), the PCU 32 moves to step S73, selects mode F (see FIG. 2) by referencing the memory 38, and drives (turns ON) the motors 24.

At step S72, if the flight state is not lift-off, hovering flight, or landing (step S72: NO), the PCU 32 moves to step S74 and judges whether the current flight state is transitional flight, based on instructions from the manipulation apparatus 30 and detection results of the machine body state detection sensor group 26 and the environment state detection sensor group 28.

At step S74, if the flight state is transitional flight (step S74: YES), the PCU 32 moves to step S75, selects mode B by referencing the memory 38, and drives the motors 24.

At step S74, if the flight state is not transitional flight (step S74: NO), the PCU 32 moves to step S76 and judges whether the current flight state is a type of forward/backward movement.

At step S76, if the flight state is any type forward/backward movement (step S76: YES), the PCU 32 moves to step S77, selects mode B by referencing the memory 38, and stops (turns OFF) the driving of the motors 24.

At step S76, if the flight state is not any type of forward/backward movement (step S76: NO), the PCU 32 moves to step S78, judges that the current flight state is the parking mode, selects mode F by referencing the memory 38, and stops the driving of the motors 24.

In this way, in the case of the OFF malfunction of the first clutch 20, the PCU 32 rotates the propulsion propeller 12 with an operational mode using the output of the motor generator 18 when there is transitional flight or any type of forward/backward movement (mode B of steps S75 and S77). In this case as well, the PCU 32 can control the motor generator 18 and the second clutch 22 to rotate the propulsion propeller 12, in accordance with the selected operational mode, and control the motors 24 to rotate the floatation propellers 14.

(4.2.3 Motor Generator Malfunction Mode)

Figure 9:
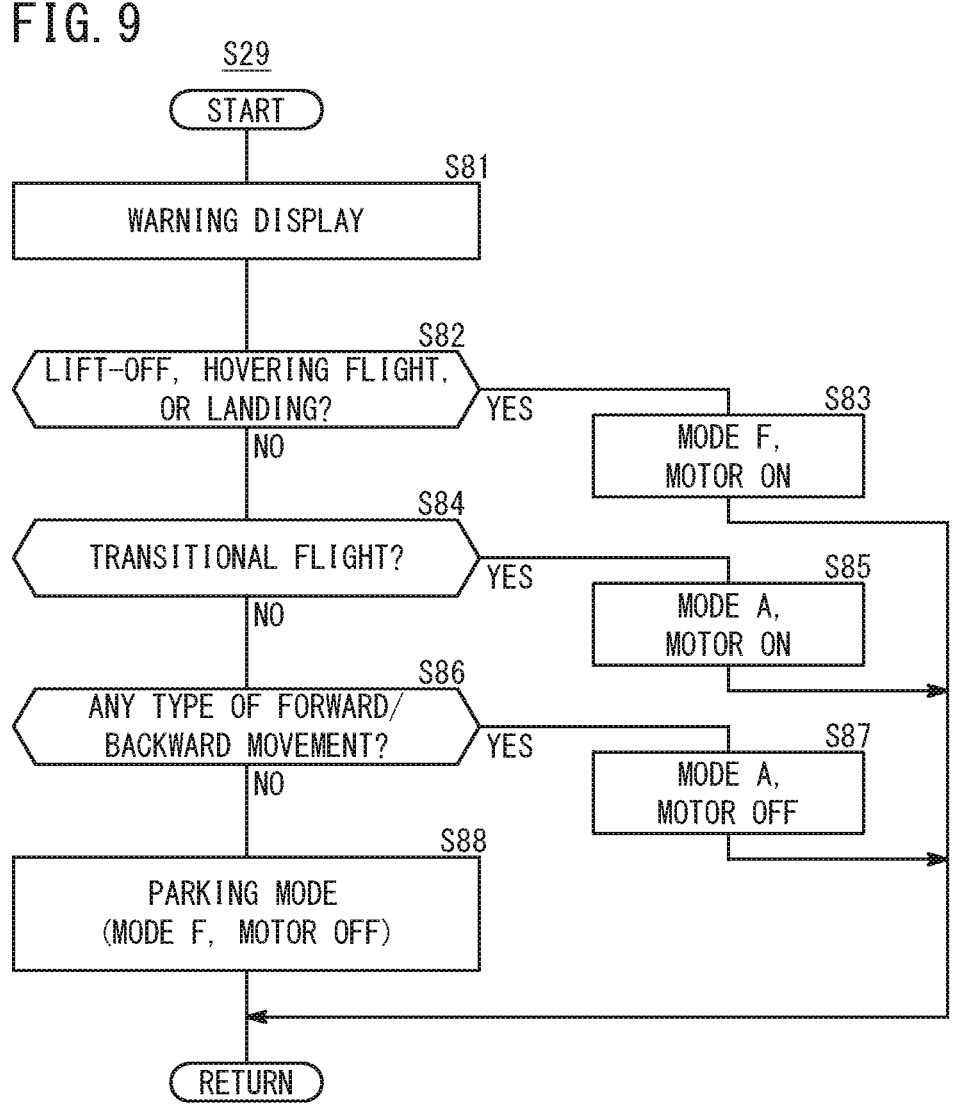
FIG. 9 is a flow chart showing the details of the motor generator malfunction mode of FIG. 5.

The details of the motor generator malfunction mode are described while referencing FIG. 9.

First, at step S81 of FIG. 9, the PCU 32 (see FIG. 1) provides notification (warning display) that the motor generator 18 is malfunctioning to the outside, via the output apparatus 34.

Next, at step S82, the PCU 32 judges whether the current operational state (flight state) of the flying body 10 is lift-off, hovering flight, or landing or not. If the flight state is lift-off, hovering flight, or landing (step S82: YES), the PCU 32 moves to step S83, selects mode F (see FIG. 2) by referencing the memory 38, and drives (turns ON) the motors 24.

At step S82, if the flight state is not lift-off, hovering flight, or landing (step S82: NO), the PCU 32 moves to step S84 and judges whether the current flight state is transitional flight, based on instructions from the manipulation apparatus 30 and detection results of the machine body state detection sensor group 26 and the environment state detection sensor group 28.

At step S84, if the flight state is transitional flight (step S84: YES), the PCU 32 moves to step S85, selects mode A by referencing the memory 38, and drives the motors 24.

At step S84, if the flight state is not transitional flight (step S84: NO), the PCU 32 moves to step S86 and judges whether the current flight state is a type of forward/backward movement.

At step S86, if the flight state is any type of forward/backward movement (step S86: YES), the PCU 32 moves to step S87, selects mode A by referencing the memory 38, and stops (turns OFF) the driving of the motors 24.

At step S86, if the flight state is not any type of forward/backward movement (step S86: NO), the PCU 32 moves to step S88, judges that the current flight state is the parking mode, selects mode F by referencing the memory 38, and stops the driving of the motors 24.

In this way, in a case where the flying body 10 is in the motor generation malfunction mode, the PCU 32 drives the engine 16 to rotate the propulsion propeller 12 when there is transitional flight or any type of forward/backward movement (mode A of steps S85 and S87). Due to this, the PCU 32 controls the first clutch 20 and the second clutch 22 to rotate the propulsion propeller 12, in accordance with the selected operational mode, and controls the motors 24 to rotate the floatation propellers 14.

(4.2.4 Second Clutch Malfunction Mode)

Figure 10:
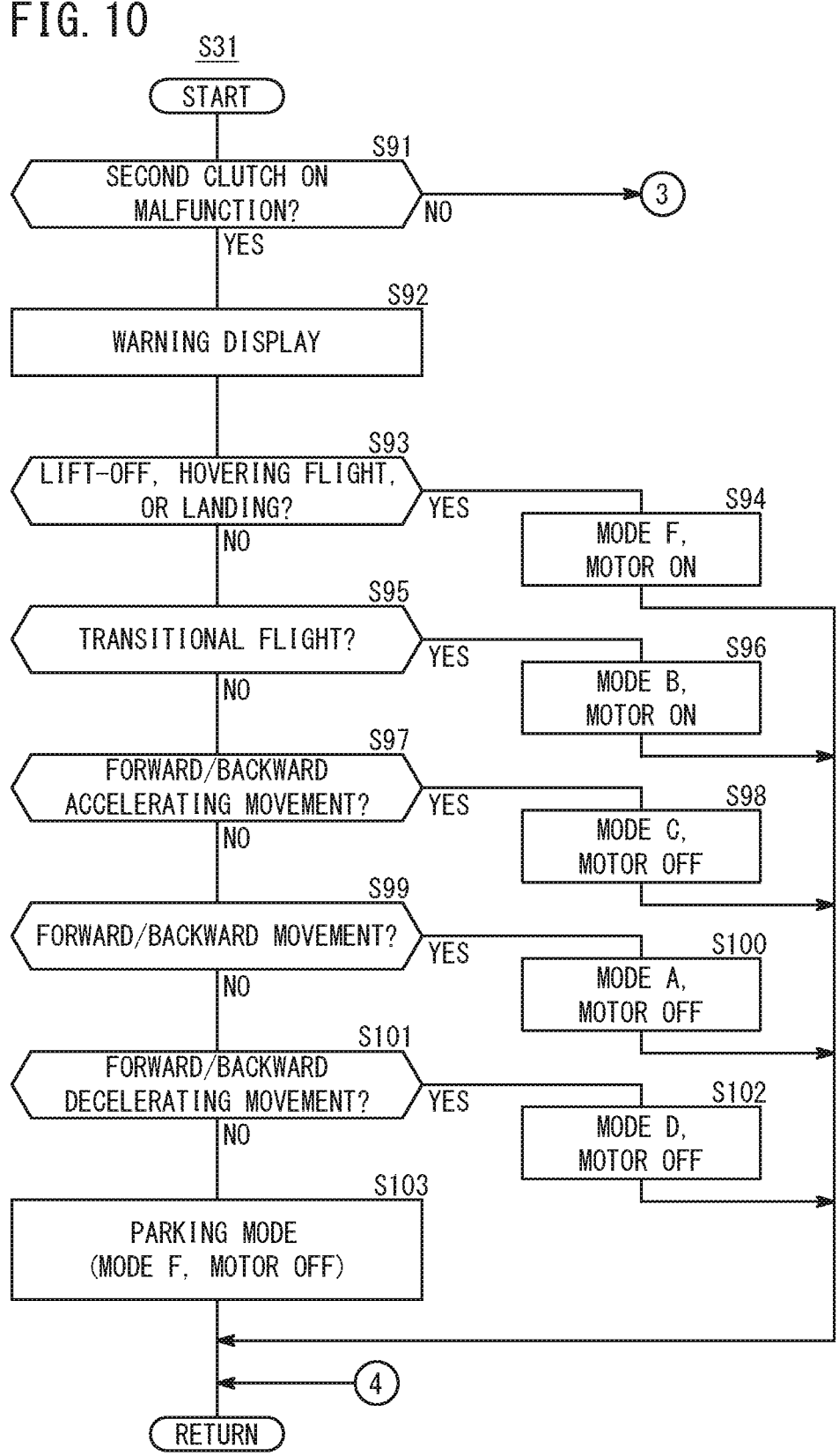
FIG. 10 is a flow chart showing the details of the second clutch malfunction mode of FIG. 5.
Figure 11:
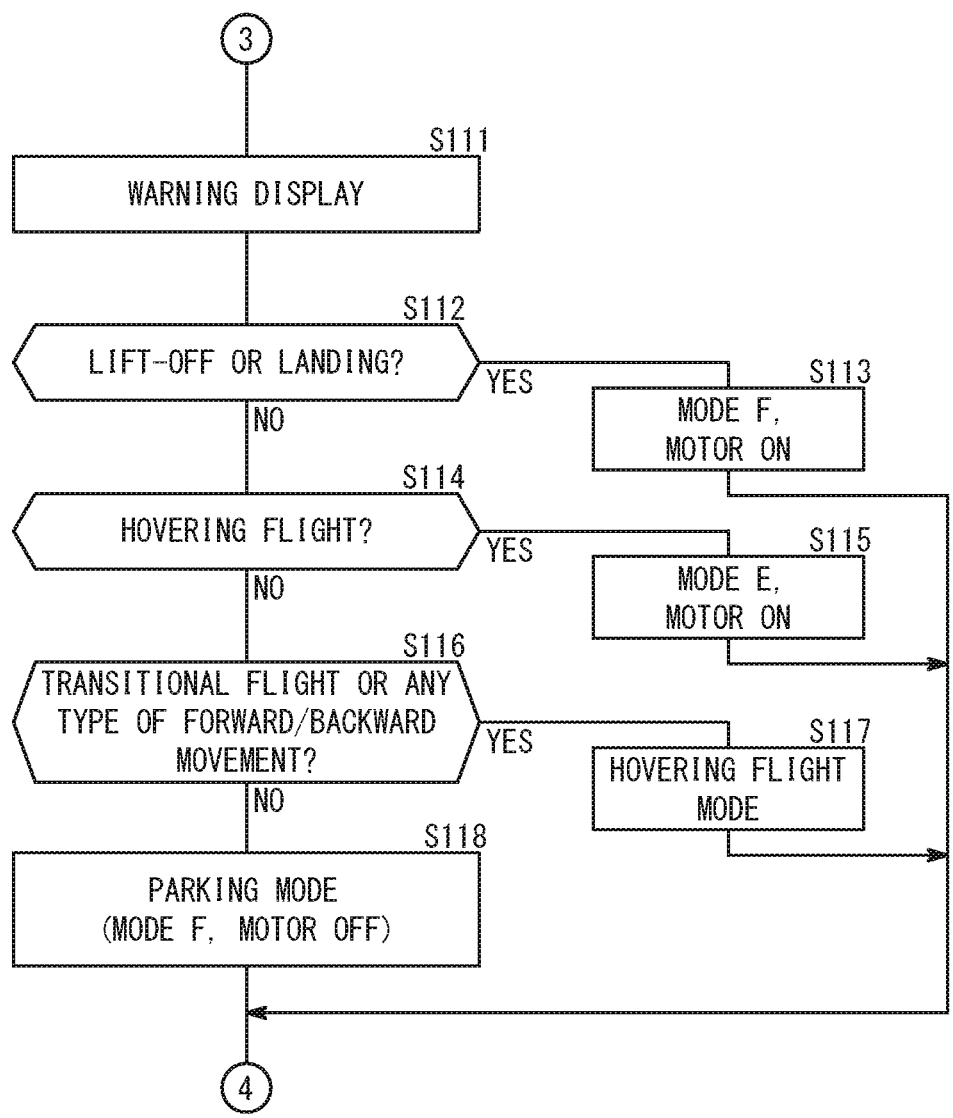
FIG. 11 is a flow chart showing the details of the second clutch malfunction mode of FIG. 5.

The details of the second clutch malfunction mode are described while referencing FIGS. 10 and 11.

First, at step S91 of FIG. 10, the PCU 32 (see FIG. 1) judges whether the malfunction in the second clutch 22 is the ON malfunction or not. If the malfunction is the ON malfunction or not (step S91: YES), the process moves to step S92. At step S92, the PCU 32 provides notification (warning display) that the second clutch 22 has an ON malfunction to the rider, via the output apparatus 34.

Next, at step S93, the PCU 32 judges whether the current operational state (flight state) of the flying body 10 is lift-off, hovering flight, or landing or not. If the flight state is lift-off, hovering flight, or landing (step S93: YES), the PCU 32 moves to step S94, selects mode F (see FIG. 2) by referencing the memory 38, and drives (turns ON) the motors 24.

At step S93, if the flight state is not lift-off, hovering flight, or landing (step S93: NO), the PCU 32 moves to step S95 and judges whether the current flight state is transitional flight, based on instructions from the manipulation apparatus 30 and detection results of the machine body state detection sensor group 26 and the environment state detection sensor group 28.

At step S95, if the flight state is transitional flight (step S95: YES), the PCU 32 moves to step S96, selects mode B by referencing the memory 38, and drives the motors 24.

At step S95, if the flight state is not transitional flight (step S95: NO), the PCU 32 moves to step S97 and judges whether the current flight state is forward/backward accelerating movement.

At step S97, if the flight state is forward/backward accelerating movement (step S97: YES), the PCU 32 moves to step S98, selects mode C by referencing the memory 38, and stops (turns OFF) the driving of the motors 24.

At step S97, if the flight state is not forward/backward accelerating movement (step S97: NO), the PCU 32 moves to step S99 and judges whether the current flight state is forward/backward movement with substantially constant velocity.

At step S99, if the flight state is forward/backward movement with substantially constant velocity (step S99: YES), the PCU 32 moves to step S100, selects mode A by referencing the memory 38, and stops the driving of the motors 24.

At step S99, if the flight state is not forward/backward movement with substantially constant velocity (step S99: NO), the PCU 32 moves to step S101 and judges whether the current flight state is backward/forward decelerating movement.

At step S101, if the flight state is backward/forward decelerating movement (step S101: YES), the PCU 32 moves to step S102, selects mode D by referencing the memory 38, and stops the driving of the motors 24.

At step S101, if the flight state is not forward/backward decelerating movement (step S101: NO), the PCU 32 moves to step S103, judges that the current flight state is the parking mode, selects mode F by referencing the memory 38, and stops the driving of the motors 24.

In this way, in the case of the ON malfunction of the second clutch 22, the PCU 32 rotates the propulsion propeller 12 in an operational mode that uses the output of the engine 16 or the output of the motor generator 18, when there is transitional flight or any type of forward/backward movement (modes B, C, A, and D of steps S96, S98, S100, and S102). In this case as well, the PCU 32 can control the engine 16, the first clutch 20, and the motor generator 18 to rotate the propulsion propeller 12, in accordance with the selected operational mode, and control the motors 24 to rotate the floatation propellers 14.

At step S91, if there is an OFF malfunction in the second clutch 22 (step S91: NO), the process moves to step S111 of FIG. 11. At step S111, the PCU 32 (see FIG. 1) provides notification (warning display) that the second clutch 22 has an OFF malfunction to the rider, via the output apparatus 34.

Next, at step S112, the PCU 32 judges whether the current operational state (flight state) of the flying body 10 is lift-off or landing or not. If the current operational state is lift-off or landing (step S112: YES), the process moves to step S113. In step S113, the PCU 32 selects mode F (see FIG. 2) by referencing the memory 38, and drives (turns ON) the motors 24.

At step S112, if the flight state is not lift-off or landing (step S112: NO), the PCU 32 moves to step S114 and judges whether the current flight state is hovering flight, based on instructions from the manipulation apparatus 30 and detection results of the machine body state detection sensor group 26 and the environment state detection sensor group 28.

At step S114, if the flight state is hovering flight (step S114; YES), the PCU 32 moves to step S115, selects mode E by referencing the memory 38, and drives the motors 24.

At step S114, if the flight state is not hovering flight (step S114: NO), the PCU 32 moves to step S116 and judges whether the current flight state is transitional flight or a type of forward/backward movement or not.

At step S116, if the flight state is transitional flight or a type of forward/backward movement (step S116; YES), the PCU 32 moves to step S117, transitions to the hovering flight mode, and drives the motors 24.

At step S116, if the flight state is not transitional flight or any type of forward/backward movement (step S116: NO), the PCU 32 moves to step S118, judges that the current flight state is the parking mode, selects mode F by referencing the memory 38, and stops the driving of the motors 24.

In this way, in the case of the OFF malfunction of the second clutch 22, since it is impossible to rotate the propulsion propeller 12, the PCU 32 causes the flying body 10 to perform hovering flight or to perform vertical flight in mode E, when there is transitional flight or any type of forward/backward movement (steps S115 and S117). In this case as well, the PCU 32 can control the motors 24 to rotate the floatation propellers 14, in accordance with the selected operational mode.

(4.2.5 Battery Malfunction Mode)

Figure 12:
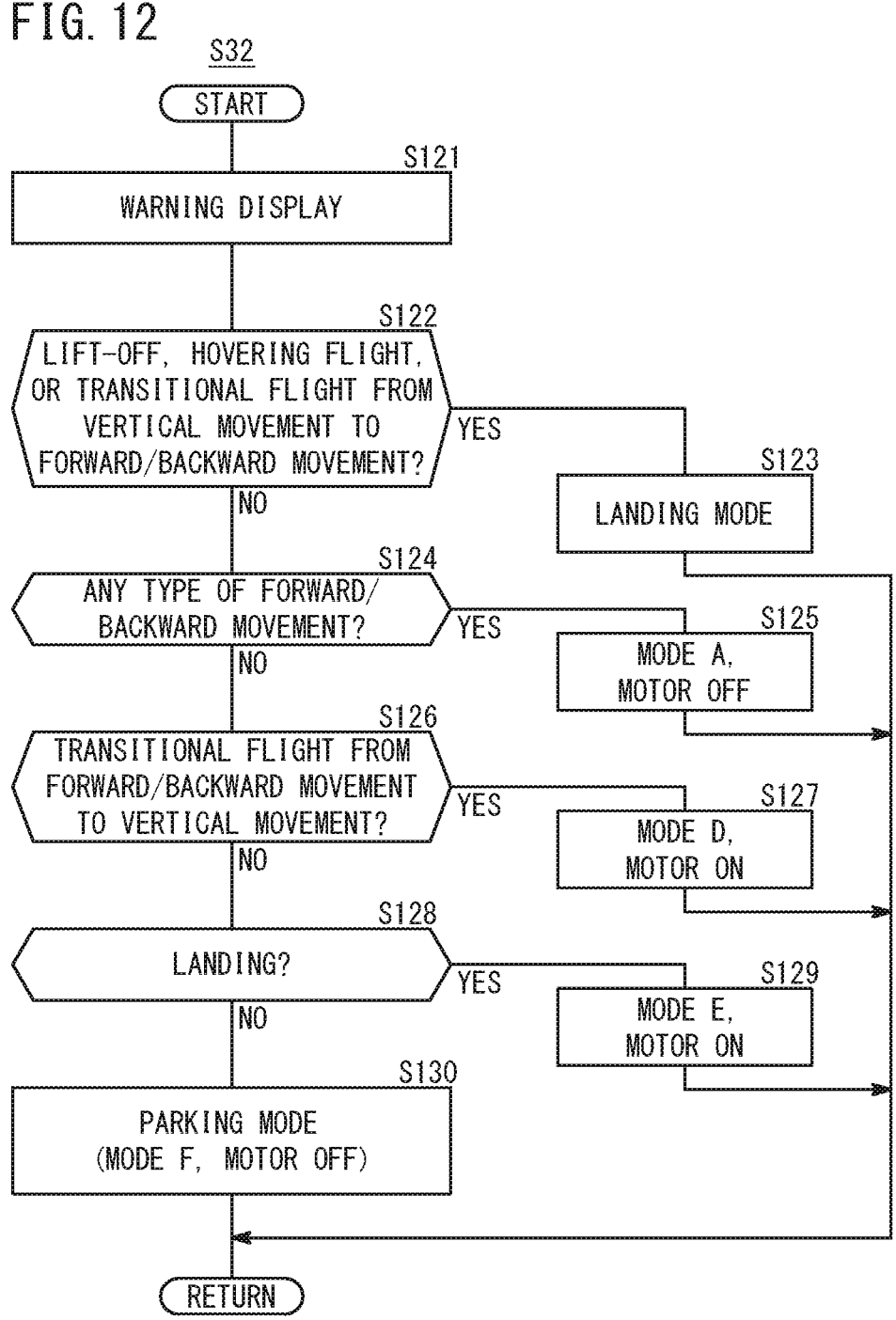
FIG. 12 is a flow chart showing the details of the battery malfunction mode of FIG. 5.

Details of the battery malfunction mode are described while referencing FIG. 12.

First, at step S121 of FIG. 12, the PCU 32 (see FIG. 1) provides notification (warning display) that the battery 36 is malfunctioning to the outside, via the output apparatus 34.

Next, at step S122, the PCU 32 judges whether the current operational state (flight state) of the flying body 10 is lift-off, hovering flight, or transitional flight from vertical flight to backward/forward movement or not. If the flight state is lift-off, hovering flight, or this transitional flight (step S122: YES), the PCU 32 moves to step S123, transitions to the landing mode, and causes the flying body 10 to land.

At step S122, if the flight state is not lift-off, hovering flight, or the transitional flight above (step S122: NO), the PCU 32 moves to step S124 and judges whether the current flight state is a type of forward/backward movement, based on instructions from the manipulation apparatus 30 and detection results of the machine body state detection sensor group 26 and the environment state detection sensor group 28.

At step S124, if the flight state is any type of forward/backward movement (step S124: YES), the PCU 32 moves to step S125, selects mode A (see FIG. 2) by referencing the memory 38, and stops driving of the motors 24.

At step S124, if the flight state is not any type of forward/backward movement (step S124: NO), the PCU 32 moves to step S126 and judges whether the current flight state is transitional flight from backward/forward movement to vertical movement.

At step S126, if the flight state is the transitional flight described above (step S126: YES), the PCU 32 moves to step S127, selects mode D by referencing the memory 38, and drives the motors 24.

At step S126, if the flight state is not the transitional flight described above (step S126: NO), the PCU 32 moves to step S128 and judges whether the current operational state is landing.

At step S128, if the flight state is the landing state (step S128: YES), the PCU 32 moves to step S129, selects mode E by referencing the memory 38, and drives the motors 24.

At step S128, if the flight state is not landing (step S128: NO), the PCU 32 moves to step S130, judges that the current flight state is the parking mode, selects mode F by referencing the memory 38, and stops the driving of the motors 24.

In this way, in a case where the flying body 10 is in the battery malfunction mode, since the power cannot be supplied from the battery 36 to each section of the flying body 10, the PCU 32 causes the motor generator 18 to generate electrical power using the output of the engine 16 and supplies this generated power to the motors 24 to drive these motors 24, when the motors 24 are controlled to rotate the floatation propellers 14 (modes D and E of steps S127 and S129). In this case as well, the PCU 32 can control the first clutch 20 and the second clutch 22 to rotate the propulsion propeller 12, in accordance with the selected operational mode, and control the motors 24 to rotate the floatation propellers 14.

(4.2.6 Multiple Failure Mode)

The details of the multiple failure mode are described while referencing FIGS. 13 and 14. Here, as an example, a case is described of a double failure, in which malfunctions occur within the flying body 10 at two locations.

As shown in FIG. 13, with a double failure, malfunctions occur in configurational elements at two locations among the engine 16, the first clutch 20, the motor generator 18, and the second clutch 22. In FIG. 13, such examples of double failures are indicated by (1) to (6). As shown in FIG. 14, for each of the double failures (1) to (6), the PCU 32 (see FIG. 1) selects the operational modes indicated in the middle cells and the bottom cells, according to the states shown in the top cells, and controls the motors 24.

In the multiple failure mode, if the occurrences of two different double failures are detected at different times, the PCU 32 prioritizes the selection of an operational mode corresponding to the double failure determined first, or selects an operational mode resulting in a greater increase in safety among the determined double failures.

As shown in FIG. 13, priority is determined by the columns and rows in the chart, and in a case where the occurrences of two different double failures are detected at different times, the operational mode corresponding to the double failure with higher priority may be selected. For example, in a case where the two double failures (1) and (2) in FIG. 13 are detected, the PCU 32 selects the double failure (1) that has higher priority, and selects the operational mode corresponding to the selected double failure (1).

In this way, in the multiple failure mode, the operational mode is selected using a different method than in the single failure mode described in FIGS. 6 to 12.

(4.2.7 Low-SOC Mode)

The details of the low-SOC mode are described while referencing FIG. 15.

First, at step S131 in FIG. 15, the PCU 32 (see FIG. 1) provides notification (warning display) that the SOC is relatively low to the rider, via the output apparatus 34.

Next, at step S132, the PCU 32 judges whether the current operational state (flight state) of the flying body 10 is lift-off, hovering flight, or landing or not. If the flight state is lift-off, hovering flight, or landing (step S132: YES), the PCU 32 moves to step S133, selects mode E (see FIG. 2) by referencing the memory 38, and drives (turns ON) the motors 24.

At step S132, if the flight state is not lift-off, hovering flight, or landing (step S132: NO), the PCU 32 moves to step S134 and judges whether the current flight state is transitional flight, based on instructions from the manipulation apparatus 30 and detection results of the machine body state detection sensor group 26 and the environment state detection sensor group 28.

At step S134, if the flight state is the transitional flight described above (step S134: YES), the PCU 32 moves to step S135, selects mode D by referencing the memory 38, and drives the motors 24.

At step S134, if the flight state is not transitional flight (step S134: NO), the PCU 32 moves to step S136 and judges whether the current flight state is forward/backward accelerating movement.

At step S136, if the flight state is forward/backward accelerating movement (step S136: YES), the PCU 32 moves to step S137, selects mode A by referencing the memory 38, and stops (turns OFF) the driving of the motors 24.

At step S136, if the flight state is not forward/backward accelerating movement (step S136: NO), the PCU 32 moves to step S138, and judges whether the current flight state is forward/backward movement with a substantially constant velocity or forward/backward decelerating movement or not.

At step S138, if the flight state is forward/backward movement with a substantially constant velocity or forward/backward decelerating movement (step S138: YES), the PCU 32 moves to step S139, selects mode D by referencing the memory 38, and stops the driving of the motors 24.

At step S138, if the flight state is not forward/backward movement with a substantially constant velocity or forward/backward decelerating movement (step S138: NO), the PCU 32 moves to step S140, judges that the current flight state is the parking mode, selects mode E by referencing the memory 38, and stops the driving of the motors 24.

In this way, in the case of the low-SOC mode, in order to prioritize charging the battery 36 or supplying power to the motors 24, the PCU 32 causes the motor generator 18 to generate electrical power using the output of the engine 16 (modes E and D of steps S133, S135, S139, and S140). At this time, the PCU 32 charges the battery 36 with surplus power remaining after the amount of power needed by the motors 24 to rotate the floatation propellers 14 is subtracted from the amount of power generated by the motor generator 18. On the other hand, in a case where the amount of power needed by the motors 24 cannot be covered by the amount of power generated by the motor generator 18, the shortfall in the power is supplied from the battery 36 to the motors 24. In this case as well, the PCU 32 can control the engine 16, the motor generator 18, and the second clutch 22 to rotate the propulsion propeller 12, in accordance with the selected operational mode, and control the motors 24 to rotate the floatation propellers 14.

[5. Effect of the Present Embodiment]

As described above, the flying body 10 according to the present embodiment is a flying body 10 including a propulsion propeller 12 (first propeller) that propels a machine body and an electric floatation propeller 14 (second propeller) that causes the machine body to float. The flying body 10 further includes an engine 16, a motor generator 18, a first clutch 20 that connects and disconnects the engine 16 and the motor generator 18, a second clutch 22 that connects and disconnects the motor generator 18 and the propulsion propeller 12, and a PCU 32 (control section). The PCU 32 has a plurality of operational modes in which at least one of the engine 16 and the motor generator 18 acts as a drive source of the propulsion propeller 12. The PCU 32 controls the engine 16, the first clutch 20, the motor generator 18, and the second clutch 22 in accordance with one operational mode, among the plurality of operational modes, depending on a state of the flying body 10.

According to the present invention, the flying body 10 includes the engine 16, the motor generator 18, the two clutches (first clutch 20 and second clutch 22), and the PCU 32, and has a hybrid configuration in which at least one of the engine 16 and the motor generator 18 acts as the drive source of the propulsion propeller 12. Furthermore, the PCU 32 has a plurality of operational modes, and connects and disconnects the first clutch 20 and connects and disconnects the second clutch 22 in an optimal operational mode, according to the state of the flying body 10.

Due to this, it is possible to make the flying body 10 fly by controlling the engine 16, the first clutch 20, the motor generator 18, and the second clutch 22 in the operational mode that is optimal from the viewpoints of safety, noise, comfort, controllability, and cost. As a result, it is possible to realize a flying body 10 with a high degree of freedom of control adaptable to various situations, without adopting a complicated configuration.

The flying body 10 further includes a motor 24 that acts as a drive source of the floatation propeller 14 and a battery 36 that supplies electrical power to each section of the flying body 10. The PCU 32 selects one operational mode from among the plurality of operational modes, based on at least one of a presence or lack of a failure in the flying body 10 and an SOC of the battery 36, and, according to the selected operational mode, controls the engine 16, the first clutch 20, the motor generator 18, and the second clutch 22, and also controls the motor 24. In this way, it is possible to select the optimal operational mode according to the presence or lack of a failure or the SOC. As a result, particularly in a normal state, it is possible to reduce the noise and increase the comfort and cost-efficiency.

Here, in a case of a normal state where a failure has not occurred in the flying body 10 and the SOC is greater than or equal to a threshold value, when the flying body 10 performs lift-off, hovering flight, or landing, the PCU 32 controls the motor 24 to rotate the floatation propeller 14. Due to this, it is possible to significantly improve the noise reduction, comfort, and cost-efficiency.

Furthermore, in the case of the normal state, when the flying body 10 transitions between lift-off, hovering flight, or landing and forward or backward flight, the PCU 32 controls the motor 24 to rotate the floatation propeller 14, and the PCU 32 also sets the first clutch 20 to the disconnected state and the second clutch 22 to the connected state, and controls the motor generator 18 to rotate the propulsion propeller 12. Due to this, it is possible to realize an improvement in the noise reduction, comfort, and cost efficiency while smoothly transitioning between vertical flight and forward or backward flight.

In a case where the SOC is less than the threshold value, when the flying body 10 performs lift-off, hovering flight, or landing, the PCU 32 sets the first clutch 20 to the connected state and the second clutch 22 to the disconnected state, causes the motor generator 18 to generate electrical power using output of the engine 16, and rotates the floatation propeller 14 by supplying the generated electrical power to the motor 24. In this way, since it is possible to select the optimal operational mode according to the SOC, it is possible to minimize the power consumption of the battery 36 in a state where the SOC is relatively low.

Furthermore, in a case where the SOC is less than the threshold value, when the flying body 10 performs transitional flight, the PCU 32 sets the first clutch 20 and the second clutch 22 to the connected state, rotates the propulsion propeller 12 using output of the engine 16, and the PCU 32 further causes the motor generator 18 to generate electrical power and supplies the generated electrical power to the motors 24 to thereby rotate the floatation propellers 14. Due to this, it is possible to realize an improvement in the noise reduction, comfort, and cost efficiency, while smoothly transitioning between vertical flight and forward/backward flight and minimizing the power consumption of the battery 36.

In this case, the PCU 32 charges the battery 36 with surplus electrical power remaining after subtracting an electrical power amount needed for rotating the floatation propeller 14 from an electrical power amount generated by the motor generator 18, and, in a case where the electrical power amount generated by the motor generator 18 cannot cover the electrical power amount needed for rotating the floatation propeller 14, supplies this lacking electrical power amount from the battery 36 to the floatation propeller 14. Due to this, it is possible to suitably supply electrical power to each section of the flying body 10 while preserving the SOC of the battery 36.

In the case of the normal state or in a case where the SOC is less than the threshold value, when the flying body 10 performs forward or backward flight, the PCU 32 sets the first clutch 20 and the second clutch 22 to the connected state and causes the propulsion propeller 12 to rotate using output of the engine 16, and also, according to a necessary output of the flying body 10, assists with the output of the engine 16 using the motor generator 18 or causes the motor generator 18 to generate electrical power. In this way, since it is possible to realize hybrid driving corresponding to the presence or lack of failures and the SOC, it is possible to realize both a restriction of the power consumption of the battery 36 and an improvement of the noise reduction, comfort, and cost efficiency.

In a case where a failure has occurred in the flying body 10, in order to prioritize continuation of the flight of the flying body 10, the PCU 32 selects, from among the plurality of operational modes, a failure mode (another operational mode) different from an operational mode used in the normal state, and controls the engine 16, the first clutch 20, the motor generator 18, and the second clutch 22 according to the selected failure mode. In this way, when a failure occurs, a driving mode with redundancy is selected, and therefore it is possible to improve the safety of the flying body 10.

Here, in a case where a plurality of failures have occurred in the flying body 10, the PCU 32 selects another operational mode for a multiple failure, which is different from the operational mode used when one failure has occurred, and controls the engine 16, the first clutch 20, the motor generator 18, and the second clutch 22 according to the selected multiple failure operational mode. In this way, by selecting a driving mode with redundancy when a plurality of failures occur, it is possible to further improve the safety of the flying body 10.

The present invention is not limited to the above-described embodiment, and it goes without saying that various modifications could be adopted therein without departing from the essence and gist of the present invention.

What is claim is:

1. A flying body comprising
a first propeller that propels the flying body;
an electric second propeller that causes the flying body to float;
an engine;
a motor generator;
a first clutch that connects and disconnects the engine and the motor generator;
a second clutch that connects and disconnects the motor generator and the first propeller;
a motor serving as a drive source of the second propeller;
a control section configured to control the engine, the first clutch, the motor generator, the second clutch, and the motor; and
a battery that supplies electrical power to the motor generator and the motor via the control section,
wherein
the control section is configured
to have a plurality of operational modes in which at least one of the engine or the motor generator acts as a drive source of the first propeller, and
to select one operational mode from among the plurality of operational modes, based on at least one of a presence of a failure in the flying body or a state of charge of the battery, and, according to the selected operational mode, control the engine, the first clutch, the motor generator, and the second clutch, and also controls the motor.

2. The flying body according to claim 1, wherein:
the control section is configured in a manner so that in a case of a normal state where the failure has not occurred in the flying body and the state of charge is greater than or equal to a threshold value, the control section controls the motor to rotate the second propeller when the flying body performs lift-off, hovering flight, or landing.

3. The flying body according to claim 1, wherein:

the control section is configured in a manner so that in a case of a normal state where the failure has not occurred in the flying body and the state of charge is greater than or equal to a threshold value, when the flying body transitions between lift-off, hovering flight, or landing and forward or backward flight, the control section controls the motor to rotate the second propeller and the control section also sets the first clutch to a disconnected state and the second clutch to a connected state and controls the motor generator to rotate the first propeller.

4. The flying body according to claim 1, wherein:
the control section is configured in a manner so that in a case where the state of charge is less than a threshold value, when the flying body performs lift-off, hovering flight, or landing, the control section sets the first clutch to a connected state and the second clutch to a disconnected state, causes the motor generator to generate electrical power using output of the engine, and rotates the second propeller by supplying the generated electrical power to the motor.

5. The flying body according to claim 1, wherein:
the control section is configured in a manner so that in a case where the state of charge is less than a threshold value, when the flying body transitions between lift-off, hovering flight, or landing and forward or backward flight, the control section sets the first clutch and the second clutch to a connected state to thereby rotate the first propeller using output of the engine, and causes the motor generator to generate electrical power and supplies the generated electrical power to the motor to thereby rotate the second propeller.

6. The flying body according to claim 4, wherein:
the control section is configured to charge the battery with surplus electrical power remaining after subtracting an electrical power amount required for rotating the second propeller from an electrical power amount generated by the motor generator, and, the control section is configured in a manner so that in a case where the electrical power amount generated by the motor generator cannot cover the electrical power amount required for rotating the second propeller, the control section supplies a shortfall in the required electrical power amount from the battery to the second propeller.

7. The flying body according to claim 1, wherein:
the control section is configured in a manner so that in a case of a normal state where the failure has not occurred in the flying body and the state of charge is greater than or equal to a threshold value, or in a case where the state of charge is less than the threshold value, when the flying body performs forward or backward flight, the control section sets the first clutch and the second clutch to a connected state and causes the first propeller to rotate using output of the engine, and also, according to a necessary output of the flying body, assists with the output of the engine using the motor generator or causes the motor generator to generate electrical power.

8. The flying body according to claim 1, wherein:
the control section is configured in a manner so that in a case where the flying body is in a failure state, in order to prioritize continuation of flight of the flying body, the control section selects, from among the plurality of operational modes, another operational mode different from an operational mode used in a normal state where the failure has not occurred in the flying body and the state of charge is greater than or equal to a threshold value, and controls the engine, the first clutch, the motor generator, and the second clutch, according to the selected operational mode.

9. The flying body according to claim 8, wherein:
the control section is configured in a manner so that in a case where a plurality of failures have occurred in the flying body, the control section selects another operational mode different from an operational mode used when one failure has occurred, and controls the engine, the first clutch, the motor generator, and the second clutch, according to the selected operational mode.

* * * * *